US012000289B2

(12) United States Patent
Guijarro Valencia et al.

(10) Patent No.: US 12,000,289 B2
(45) Date of Patent: Jun. 4, 2024

(54) SEAL ASSEMBLIES FOR TURBINE ENGINES AND RELATED METHODS

(71) Applicants: General Electric Company, Schenectady, NY (US); General Electric Deutschland Holding GmbH, Frankfurt (DE)

(72) Inventors: Antonio Guijarro Valencia, Munich (DE); Rodrigo Rodriguez Erdmenger, Munich (DE); Rahul Anil Bidkar, Clifton Park, NY (US); Scott Alan Schimmels, Miamisburg, OH (US); Tran Quang Tue Nguyen, Bremen (DE)

(73) Assignees: General Electric Company, Schenectady, NY (US); General Electric Deutschland Holding GmbH, Frankfurt (DE)

( * ) Notice: Subject to any disclaimer, the term of this patent is extended or adjusted under 35 U.S.C. 154(b) by 29 days.

(21) Appl. No.: 17/691,380

(22) Filed: Mar. 10, 2022

(65) Prior Publication Data

US 2023/0287797 A1 Sep. 14, 2023

(51) Int. Cl.
*F01D 11/16* (2006.01)

(52) U.S. Cl.
CPC .......... *F01D 11/16* (2013.01); *F05D 2240/58* (2013.01); *F05D 2260/608* (2013.01)

(58) Field of Classification Search
CPC ........ F01D 11/16; F01D 25/04; F01D 11/001; F01D 11/003; F01D 11/04; F01D 25/183; F01D 11/025; F05D 2240/58; F05D 2260/608; F05D 2240/55; F05D 2260/38; F05D 2300/12; F05D 2300/505; F16J 15/342; F16J 15/40
USPC ......................... 277/304, 387, 401, 408, 431
See application file for complete search history.

(56) References Cited

U.S. PATENT DOCUMENTS

| | | | |
|---|---|---|---|
| 4,856,963 | A | 8/1989 | Klapproth et al. |
| 4,983,051 | A | 1/1991 | Hibner et al. |
| 5,100,158 | A | 3/1992 | Gardner |
| 5,143,384 | A | 9/1992 | Lipschitz |

(Continued)

OTHER PUBLICATIONS

Bruce et al., Advanced Seal Technology Role in Meeting Next Generation Turbine Engine Goals, National Aeronautics and Space Administration Lewis Research Center, France, May 11-15, 1998, pp. 1-14.

(Continued)

*Primary Examiner* — Aaron R Eastman
(74) *Attorney, Agent, or Firm* — Dority & Manning, P.A.

(57) ABSTRACT

A seal assembly for a rotary machine, such as a turbine engine, may include one or more seal segments that respectively include a seal housing defining a seal chamber and one or more fluid supply apertures that pass through the seal housing, and a seal body defining a seal face and one or more fluid conduits that pass through the seal body to the seal face. The seal chamber may receive at least a portion of the seal body, and the seal body may move within the seal chamber along a radial axis of a rotor of the rotary engine. The fluid supply apertures may fluidly communicate with the fluid conduits, and the fluid conduits may fluidly communicate with a fluid-bearing gap defined between the seal face and a rotor face of the rotor.

20 Claims, 9 Drawing Sheets

(56) References Cited

U.S. PATENT DOCUMENTS

| | | | |
|---|---|---|---|
| 5,301,957 A | 4/1994 | Hwang et al. | |
| 5,509,664 A | 4/1996 | Borkiewicz | |
| 5,975,537 A | 11/1999 | Turnquist et al. | |
| 6,145,843 A | 11/2000 | Hwang | |
| 6,202,302 B1 | 3/2001 | Descoteaux | |
| 6,210,103 B1 | 4/2001 | Ramsay | |
| 6,505,837 B1 | 1/2003 | Heshmat | |
| 6,692,006 B2 | 2/2004 | Holder | |
| 6,811,154 B2 | 11/2004 | Proctor et al. | |
| 6,895,757 B2 | 5/2005 | Mitchell et al. | |
| 7,334,980 B2 | 2/2008 | Trinks et al. | |
| 7,438,526 B2 | 10/2008 | Enderby | |
| 7,459,081 B2 | 12/2008 | Koenig et al. | |
| 7,726,660 B2 | 6/2010 | Datta | |
| 8,002,285 B2 | 8/2011 | Justak | |
| 8,056,902 B2 | 11/2011 | Roddis et al. | |
| 8,142,141 B2 | 3/2012 | Tesh et al. | |
| 8,434,766 B2 | 5/2013 | Zeng et al. | |
| 8,641,045 B2 | 2/2014 | Justak | |
| 9,045,994 B2 | 6/2015 | Bidkar et al. | |
| 9,103,223 B2 | 8/2015 | Uehara et al. | |
| 9,115,810 B2 | 8/2015 | Bidkar et al. | |
| 9,145,785 B2 | 9/2015 | Bidkar et al. | |
| 9,255,642 B2 | 2/2016 | Bidkar et al. | |
| 9,359,908 B2 | 6/2016 | Bidkar et al. | |
| 9,394,801 B2 | 7/2016 | Willett, Jr. | |
| 9,587,746 B2 | 3/2017 | Bidkar et al. | |
| 9,598,971 B2 | 3/2017 | Hasnedl et al. | |
| 9,890,650 B2 | 2/2018 | Von Berg et al. | |
| 10,161,259 B2 | 12/2018 | Gibson et al. | |
| 10,190,431 B2 * | 1/2019 | Bidkar | F16J 15/447 |
| 10,352,455 B2 | 7/2019 | Berard et al. | |
| 10,443,424 B2 | 10/2019 | McCaffrey | |
| 2001/0007632 A1 | 7/2001 | Pesek et al. | |
| 2008/0265513 A1 | 10/2008 | Justak | |
| 2012/0211944 A1 | 8/2012 | Nishimoto et al. | |
| 2012/0248704 A1 | 10/2012 | Fennell et al. | |
| 2014/0008871 A1 | 1/2014 | Bidkar et al. | |
| 2014/0062024 A1 | 3/2014 | Bidkar et al. | |
| 2014/0117624 A1 | 5/2014 | Bidkar et al. | |
| 2014/0119912 A1 | 5/2014 | Bidkar et al. | |
| 2016/0010480 A1 | 1/2016 | Bidkar et al. | |
| 2016/0061331 A1 * | 3/2016 | Taylor | F16J 15/002 277/377 |
| 2016/0130963 A1 | 5/2016 | Wilson et al. | |
| 2017/0051834 A1 | 2/2017 | Webster et al. | |
| 2017/0211402 A1 | 7/2017 | Peters et al. | |
| 2018/0045066 A1 | 2/2018 | Chuong | |
| 2018/0058240 A1 | 3/2018 | Chuong et al. | |
| 2019/0072186 A1 | 3/2019 | Bidkar et al. | |
| 2019/0203842 A1 | 7/2019 | Bidkar et al. | |
| 2019/0218926 A1 | 7/2019 | DiFrancesco et al. | |
| 2019/0276851 A1 | 9/2019 | Lin | |
| 2020/0040735 A1 | 2/2020 | Millier et al. | |
| 2020/0063588 A1 | 2/2020 | Morliere et al. | |
| 2020/0102845 A1 | 4/2020 | DiFrancesco et al. | |
| 2020/0157964 A1 * | 5/2020 | Rodriguez Erdmenger | F01D 11/04 |
| 2020/0318489 A1 | 10/2020 | Webb | |
| 2022/0154590 A1 * | 5/2022 | Berard | F16J 15/3404 |

OTHER PUBLICATIONS

Chupp et al., Sealing in Turbomachinery, NASA/TM-2006-214341, National Aeronautics and Space Administration, Cleveland, OH, 2006, 62 Pages.

Delgado et al., A Review of Engine Seal Performance and Requirements for Current and Future Army Engine Platforms, NASA/TM-2008-215161, 43rd Joint Propulsion Conference Co-Sponsored by AIAA, ASME, SAE, and ASEE, Cincinnati, OH, Jul. 8-11, 2007, 22 Pages.

Grondahl et al., Film Riding Leaf Seals for Improved Shaft Sealing, Proceedings of ASME Turbo Expo 2010: Power for Land, Sea and Air, GT2010-23629, Glasgow UK, Jun. 14-18, 2010, 8 Pages.

Munson et al., Development of Film Riding Face Seals for a Gas Turbine Engine, Tribology Transactions, vol. 35, Issue 1, Mar. 25, 2008, pp. 65-70.

* cited by examiner

SEAL ASSEMBLIES FOR TURBINE ENGINES AND RELATED METHODS

FIELD

The present disclosure generally pertains to seal assemblies for rotary machines, and more particularly, to seals for rotary machines such as turbine engines, as well as methods of manufacturing seal assemblies and methods of sealing an interface between a rotor and a stator of a rotary machine.

BACKGROUND

Rotary machines such as gas turbine engines have seals between rotating components (e.g., rotors) and corresponding stationary components (e.g., stators). These seals help to reduce leakage of fluids between the rotors and stators. Transient operating conditions and/or aberrant movements of the rotor may result in leakage of the seal. Excessive leakage of a seal in a rotary machine can significantly reduce the operating efficiency of the rotary machine. Transient operating conditions and/or aberrant movements of the rotor may also result in increased friction and/or contact between the seal and the rotor. Such friction and/or contact between the seal and the rotor may result in premature wear and/or reduced operating efficiency of the rotary machine. Accordingly, it would be welcomed in the art to provide improved seal assemblies for rotary machines such as turbine engines, as well as improved methods of sealing an interface between a rotor and a stator of a rotary machine.

BRIEF DESCRIPTION OF THE DRAWINGS

A full and enabling disclosure, including the best mode thereof, directed to one of ordinary skill in the art, is set forth in the specification, which makes reference to the appended Figures, in which.

Figure 1:
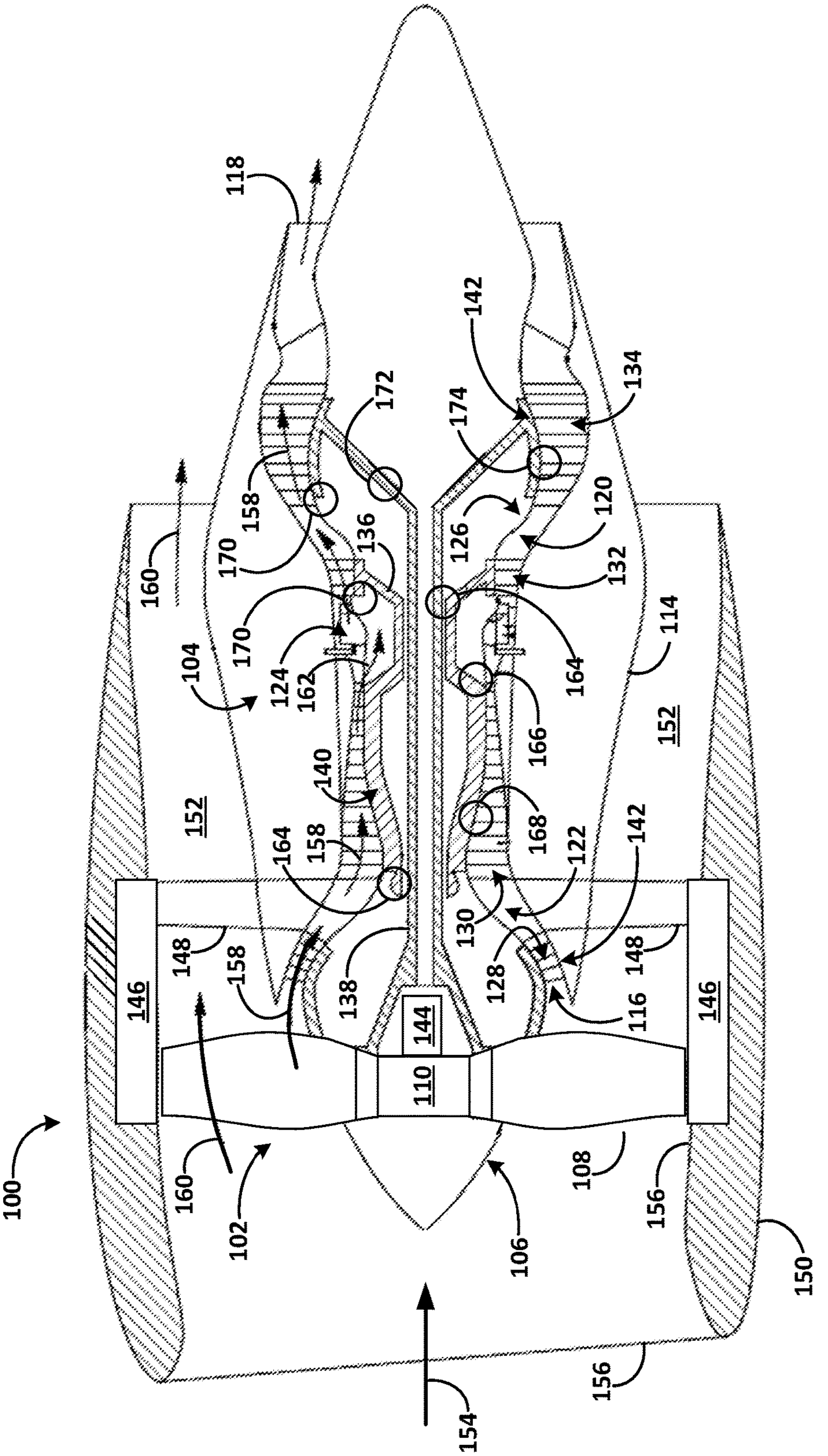
FIG. 1 shows a schematic cross-sectional view of an exemplary turbine engine.

Repeat use of reference characters in the present specification and drawings is intended to represent the same or analogous features or elements of the present disclosure.

DETAILED DESCRIPTION

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "upper", "lower", "right", "left", "vertical", "horizontal", "top", "bottom", "lateral", "longitudinal", and so forth, shall relate to the disclosure as it is oriented in the drawing figures. However, it is to be understood that the disclosure may assume various alternative orientations, except where expressly specified to the contrary. It is also to be understood that the specific devices illustrated in the attached drawings, and described in the following specification, are simply exemplary embodiments of the disclosure. Hence, specific dimensions and other physical characteristics related to the embodiments disclosed herein are not to be considered as limiting.

The terms "forward" and "aft" refer to relative positions within a turbine engine, with forward referring to a position closer to an engine inlet and aft referring to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The singular forms "a", "an", and "the" include plural references unless the context clearly dictates otherwise.

The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Additionally, the terms "low," "high," or their respective comparative degrees (e.g., lower, higher, where applicable) each refer to relative speeds within an engine, unless otherwise specified. For example, a "low-pressure turbine" operates at a pressure generally lower than a "high-pressure turbine." Alternatively, unless otherwise specified, the aforementioned terms may be understood in their superlative degree. For example, a "low-pressure turbine" may refer to the lowest maximum pressure turbine within a turbine section 126, and a "high-pressure turbine" may refer to the highest maximum pressure turbine within the turbine section 126.

The term "turbomachine" or "turbomachinery" refers to a machine including one or more compressors, a heat generating section (e.g., a combustor section), and one or more turbines that together generate a torque output.

As used herein, the term "turbine engine" refers to an engine that includes a turbomachine as all or a portion of its power source. Example turbine engines include gas turbine engines, as well as hybrid-electric turbine engines, such as turbofan engines, turboprop engines, turbojet engines, turboshaft engines, and the like.

As used herein, the term "rotor" refers to any component of a rotary machine, such as a turbine engine, that rotates about an axis of rotation. By way of example, a rotor may include a shaft or a spool of a rotary machine, such as a turbine engine.

As used herein, the term "stator" refers to any component of a rotary machine, such as a turbine engine, that has a coaxial configuration and arrangement with a rotor of the rotary machine. A stator may be stationary or may rotate about an axis of rotation. A stator may be disposed radially inward or radially outward along a radial axis in relation to a rotor.

One or more components of the turbomachine engine described herein below may be manufactured or formed using any suitable process, such as an additive manufacturing process (e.g., a 3-D printing process). The use of such a process may allow such component to be formed integrally, as a single monolithic component, or as any suitable number of sub-components. In particular, the additive manufacturing process may allow such component to be integrally formed and include a variety of features not possible when using prior manufacturing methods. For example, the additive manufacturing methods described herein may allow for the manufacture of passages, conduits, cavities, openings, casings, manifolds, double-walls, heat exchangers, or other components, or particular positionings and integrations of such components, having unique features, configurations, thicknesses, materials, densities, fluid passageways, headers, and mounting structures that may not have been possible or practical using prior manufacturing methods. Some of these features are described herein.

Suitable additive manufacturing technologies in accordance with the present disclosure include, for example, Selective Laser Melting (SLM), Direct Metal Laser Melting (DMLM), Fused Deposition Modeling (FDM), Selective Laser Sintering (SLS), 3D printing such as by inkjets, laser jets, and binder jets, Stereolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), and other known processes.

Suitable powder materials for the manufacture of the structures provided herein as integral, unitary, structures include metallic alloy, polymer, or ceramic powders. Exemplary metallic powder materials are stainless-steel alloys, cobalt-chrome alloys, aluminum alloys, titanium alloys, nickel-based superalloys, and cobalt-based superalloys. In addition, suitable alloys may include those that have been engineered to have good oxidation resistance, known as "superalloys" which have acceptable strength at the elevated temperatures of operation in a turbine engine, e.g. Hastelloy, Inconel alloys (e.g., IN 738, IN 792, IN 939), Rene alloys (e.g., Rene N4, Rene N5, Rene 80, Rene 142, Rene 195), Haynes alloys, Mar M, CM 247, CM 247 LC, C263, 718, X-850, ECY 768, 282, X45, PWA 1483 and CMSX (e.g. CMSX-4) single crystal alloys. The manufactured objects of the present disclosure may be formed with one or more selected crystalline microstructures, such as directionally solidified ("DS") or single-crystal ("SX").

As used herein, the terms "integral", "unitary", or "monolithic" as used to describe a structure refers to the structure being formed integrally of a continuous material or group of materials with no seams, connections joints, or the like. The integral, unitary structures described herein may be formed through additive manufacturing to have the described structure, or alternatively through a casting process, etc.

The present disclosure generally provides seal assemblies for rotary machines. The presently disclosed seal assemblies may be utilized in any rotary machine. Exemplary embodiments may be particularly suitable for turbomachines, such as turbine engines, and the like. The presently disclosed seal assemblies include film-riding seals that provide a thin film of fluid between a face of the seal and a face of the rotor. The thin film of fluid may be provided by one or more fluid supply ports that allow fluid, such as pressurized air or gas within a turbine engine, to flow from a higher-pressure region on one side of the seal assembly to a lower-pressure region on another side of the seal assembly. The fluid flowing through the fluid supply ports passes through a fluid-bearing gap between the seal face and the rotor face. The fluid within the fluid-bearing gap provides a thin film of pressurized fluid between the seal face and the rotor face. The thin film of pressurized fluid acts as a fluid bearing, such as a gas bearing, that inhibits contact between the seal and the rotor. For example, the fluid bearing may be a hydrostatic bearing, an aerostatic bearing, or the like.

The presently disclosed seal assemblies are generally considered non-contacting seals, in that the fluid bearing inhibits contact between the seal face and the rotor face. Additionally, the presently disclosed seal assemblies include rotor shoes that are configured to float or actuate along a motion axis in response to motive forces caused by transient operating conditions of the rotary machine and/or aberrant movement of the rotor. The seal assemblies include features described herein that provide for improved movement of the rotor shoes along the motion axis, improved positioning of the seal face relative to the rotor face, enhanced range of motion of the rotor shoe, and/or improved responsiveness to transient operating conditions and/or aberrant movement of the rotor. The presently disclosed seal assemblies may accommodate a wider range of operating conditions and/or may provide improved operating performance, including improved performance of the seal assembly and/or improved performance of the rotary machine. Additionally, or in the alternative, the presently disclosed seal assemblies may provide for a lower likelihood of contact between the seal face and the rotor face during transient conditions, thereby enhancing the durability and/or useful life of the seal assembly, rotor, and/or related components of the rotary machine.

Exemplary embodiments of the present disclosure will now be described in further detail. Referring to FIG. 1, an exemplary turbine engine 100 will be described. In some embodiments, the presently disclosed seal assemblies may be included in a rotary machine such as a turbine engine 100. An exemplary turbine engine 100 may be mounted to an aircraft, such as in an under-wing configuration or tail-mounted configuration. It will be appreciated that the turbine engine 100 shown in FIG. 1 is provided by way of example and not to be limiting, and that the subject matter of the present disclosure may be implemented with other types of turbine engines, as well as other types of rotary machines.

In general, a turbine engine 100 may include a fan section 102 and a core engine 104 disposed downstream from the fan section 102. The fan section 102 may include a fan 106 with any suitable configuration, such as a variable pitch, single stage configuration. The fan 106 may include a plurality of fan blades 108 coupled to a fan disk 110 in a spaced apart manner. The fan blades 108 may extend outwardly from the fan disk 110 generally along a radial direction. The core engine 104 may be coupled directly or indirectly to the fan section 102 to provide torque for driving the fan section 102.

The core engine 104 may include an engine case 114 that encases one or more portions of the core engine 104, including, a compressor section 122, a combustor section 124, and a turbine section 126. The engine case 114 may define a core engine-inlet 116, an exhaust nozzle 118, and a core air flowpath 120 therebetween. The core air flowpath 120 may pass through the compressor section 122, the combustor section 124, and the turbine section 126, in serial flow relationship. The compressor section 122 may include a first, booster or low pressure (LP) compressor 128 and a second, high pressure (HP) compressor 130. The turbine section 126 may include a first, high pressure (HP) turbine 132 and a second, low pressure (LP) turbine 134. The compressor section 122, combustor section 124, turbine section 126, and exhaust nozzle 118 may be arranged in serial flow relationship and may respectively define a portion of the core air flowpath 120 through the core engine 104.

The core engine 104 and the fan section 102 may be coupled to a shaft driven by the core engine 104. By way of example, as shown in FIG. 1, the core engine 104 may include a high pressure (HP) shaft 136 and a low pressure (LP) shaft 138. The HP shaft 136 may drivingly connect the HP turbine 132 to the HP compressor 130. The LP shaft 138 may drivingly connect the LP turbine 134 to the LP compressor 128. In other embodiments, a turbine engine 100 may have three shafts, such as in the case of a turbine engine 100 that includes an intermediate pressure turbine. A shaft of the core engine 104, together with a rotating portion of the core engine 104, may sometimes be referred to as a "spool." The HP shaft 136, a rotating portion of the HP compressor 130 coupled to the HP shaft 136, and a rotating portion of the HP turbine 132 coupled to the HP shaft 136, may be collectively referred to as a high pressure (HP) spool 140. The LP shaft 138, a rotating portion of the LP compressor 128 coupled to the LP shaft 138, a rotating portion of the LP turbine 134 coupled to the LP shaft 138, may be collectively referred to as low pressure (LP) spool 142.

In some embodiments, the fan section 102 may be coupled directly to a shaft of the core engine 104, such as directly to an LP shaft 138. Alternatively, as shown in FIG. 1, the fan section 102 and the core engine 104 may be coupled to one another by way of a power gearbox 144, such as a planetary reduction gearbox, an epicyclical gearbox, or the like. For example, the power gearbox 144 may couple the LP shaft 138 to the fan 106, such as to the fan disk 110 of the fan section 102. The power gearbox 144 may include a plurality of gears for stepping down the rotational speed of the LP shaft 138 to a more efficient rotational speed for the fan section 102.

Still referring to FIG. 1, the fan section 102 of the turbine engine 100 may include a fan case 146 that at least partially surrounds the fan 106 and/or the plurality of fan blades 108. The fan case 146 may be supported by the core engine 104, for example, by a plurality of outlet guide vanes 148 circumferentially spaced and extending substantially radially therebetween. The turbine engine 100 may include a nacelle 150. The nacelle 150 may be secured to the fan case 146. The nacelle 150 may include one or more sections that at least partially surround the fan section 102, the fan case 146, and/or the core engine 104. For example, the nacelle 150 may include a nose cowl, a fan cowl, an engine cowl, a thrust reverser, and so forth. The fan case 146 and/or an inward portion of the nacelle 150 may circumferentially surround an outer portion of the core engine 104. The fan case 146 and/or the inward portion of the nacelle 150 may define a bypass passage 152. The bypass passage 152 may be disposed annularly between an outer portion of the core engine 104 and the fan case 146 and/or inward portion of the nacelle 150 surrounding the outer portion of the core engine 104.

During operation of the turbine engine 100, an inlet airflow 154 enters the turbine engine 100 through an inlet 156 defined by the nacelle 150, such as a nose cowl of the nacelle 150. The inlet airflow 154 passes across the fan blades 108. The inlet airflow 154 splits into a core airflow 158 that flows into and through the core air flowpath 120 of the core engine 104 and a bypass airflow 160 that flow through the bypass passage 152. The core airflow 158 is compressed by the compressor section 122. Pressurized air from the compressor section 122 flows downstream to the combustor section 124 where fuel is introduced to generate combustion gas, as represented by arrow 162. The combustion gas exit the combustor section 124 and flow through the turbine section 126, generating torque that rotates the compressor section 122 to support combustion while also rotating the fan section 102. Rotation of the fan section 102 causes the bypass airflow 160 to flow through the bypass passage 152, generating propulsive thrust. Additional thrust is generated by the core airflow exiting the exhaust nozzle 118.

In some exemplary embodiments, the turbine engine 100 may be a relatively large power class turbine engine 100 that may generate a relatively large amount of thrust. For example, the turbine engine 100 may be configured to generate from about 300 Kilonewtons (kN) of thrust to about 700 kN of thrust, such as from about 300 kN to about 500 kN of thrust, such as from about 500 kN to about 600 kN of thrust, or such as from about 600 kN to about 700 kN of thrust. However, it will be appreciated that the various features and attributes of the turbine engine 100 described with reference to FIG. 1 are provided by way of example only and not to be limiting. In fact, the present disclosure may be implemented with respect to any desired turbine engine, including those with attributes or features that differ in one or more respects from the turbine engine 100 described herein.

Still referring to FIG. 1, the turbine engine 100 includes seal assemblies at a number of locations throughout the turbine engine 100, any one or more of which may be configured according to the present disclosure. A presently disclosed seal assembly may be provided in a turbine engine 100 at any location that includes an interface with a rotating portion of the turbine engine 100, such as an interface with a rotating portion or spool of the core engine 104. For example, a seal assembly may be included at an interface with a portion of the LP spool 142 and/or at an interface with the HP spool 140. In some embodiments, a seal assembly may be included at an interface between a spool, such as the LP spool 142 or the HP spool 140, a stationary portion of the core engine 104. Additionally, or in the alternative, a seal assembly may be included at an interface between the LP spool 142 and the HP spool 140. Additionally, or in the alternative, a seal assembly may be included at an interface between a stationary portion of the core engine 104 and the LP shaft 138 or the HP shaft 136, and/or at an interface between the LP shaft 138 and the HP shaft 136.

By way of example, FIG. 1 shows some exemplary locations of a seal assembly. As one example, a seal assembly may be located at or near a bearing compartment 164. A seal assembly located at or near a bearing compartment 164 may sometimes be referred to as a bearing compartment seal. Such a bearing compartment seal may inhibit air flow, such as core airflow 158 from passing into a bearing compartment of the turbine engine 100, such as a bearing compartment located at an interface between the LP shaft 138 and the HP shaft 136. As another example, a seal assembly may be located at or near the compressor section 122 of the turbine engine 100. In some embodiments, a seal assembly may be located at or near a compressor discharge 166, for example, of the HP compressor 130. A seal assembly located at or near a compressor discharge 166 may sometimes be referred to as a compressor discharge pressure seal. Such a compressor discharge pressure seal may maintain pressure downstream of the compressor section 122 and/or to provide bearing thrust balance. Additionally, or in the alternative, a seal assembly may be located between adjacent compressor stages 168 of the compressor section 122. A seal assembly located between adjacent compressor stages 168 may be sometimes referred to as a compressor interstage seal. Such a compressor interstage seal may limit air recirculation within the compressor section 122. As another example, a seal assembly may be located at or near the turbine section 126 of the turbine engine 100. In some embodiments, a seal assembly may be located at or near a turbine inlet 170, for example, of the HP turbine 132 or the LP turbine 134. A seal assembly located at or near a turbine inlet 170 may sometimes be referred to as a forward turbine seal. Such a forward turbine seal may contain high-pressure cooling air for the HP turbine 132 and/or the LP turbine 134, such as for turbine disks and turbine blades thereof. Additionally, or in the alternative, a seal assembly may be located at or near none or more turbine disk rims 172. A seal assembly located at or near a turbine disk rim 172 may sometimes be referred to as a turbine disk rim seal. Such a turbine disk rim seal may inhibit hot gas ingestion into the disk rim area. Additionally, or in the alternative, a seal assembly may be located between adjacent turbine stages 174 of the turbine section 126. A seal assembly located between adjacent turbine stages 174 may be sometimes referred to as a turbine interstage seal. Such a turbine interstage seal may limit air recirculation within the turbine section 126.

A seal assembly at any one or more of these locations or other location of a turbine engine 100 may be configured in accordance with the present disclosure. Additionally, or in the alternative, a turbine engine 100 may include a presently disclosed seal assembly at one or more other locations of the turbine engine 100. It will also be appreciated that the presently disclosed seal assemblies may also be used in other rotary machines, and that the turbine engine 100 described with reference to FIG. 1 is provided by way of example and not to be limiting.

Figure 2A:
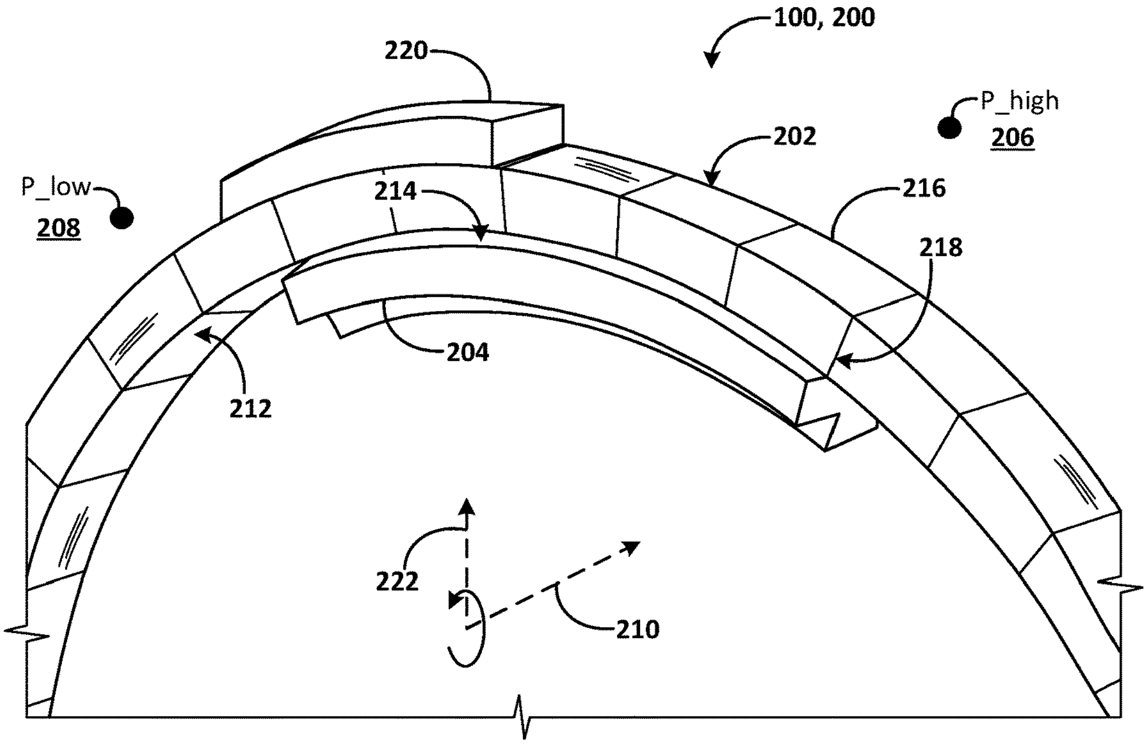
FIGS. 2A and 2B respectively show schematic perspective views of an exemplary seal assembly disposed between a portion of a rotor and a stator of a turbine engine.
Figure 2B:
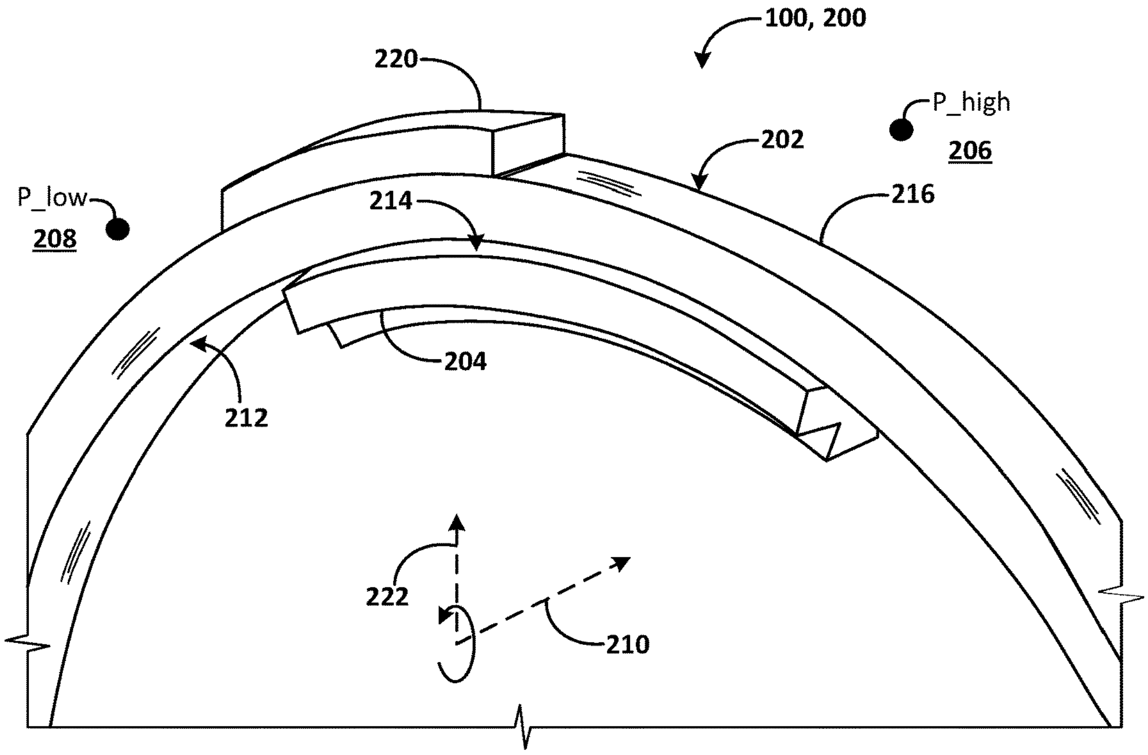

Now referring to FIGS. 2A and 2B, exemplary seal assemblies are further described. As shown in FIGS. 2A and 2B, a rotary machine 200, such as a turbine engine 100, may include a seal assembly 202 that interfaces with a rotor 204 of a rotary machine 200. The seal assembly 202 may be integrated into any rotary machine 200, such as a turbine engine 100 as described with reference to FIG. 1. As shown in FIGS. 2A and 2B, the seal assembly 202 may separate an inlet plenum 206 from an outlet plenum 208. The inlet plenum 206 may define a region of the rotary machine 200 that includes a relatively higher-pressure fluid volume (p_high). The inlet plenum 206 may be located at a distal position relative to an axis of rotation 210 of the rotor 204. The outlet plenum 208 may define a region of the rotary machine 200 that includes a relatively lower-pressure fluid volume (p_low). The outlet plenum 208 may be located at a proximal position relative to the axis of rotation 210 of the rotor 204. The axis of rotation 210 may coincide with and/or may extend parallel to a longitudinal axis of the rotary machine 200, such as the turbine engine 100. The seal assembly 202 may be configured as a film-riding seal that provides a non-contacting seal interface that inhibits contact between the seal assembly 202 the rotor 204, such as a fluid bearing, a gas bearing, or the like, located, for example, between a seal face 212 of the seal assembly 202 and a rotor face 214 of the rotor 204. During operation, a fluid within the inlet plenum 206 may flow through one or more pathways of the seal assembly 202 to the outlet plenum 208. The fluid flow may provide for the non-contacting seal interface. In some embodiments, the fluid may include pressurized air, gas, and/or vapor. In other embodiments, the fluid may include a liquid.

The seal assembly 202 may include one more seal segments 216. The seal assembly 202 may have an annular configuration defined by the one or more seal segments 216. The one or more seal segments 216 may be disposed circumferentially about the axis of rotation 210. In some embodiments, as shown in FIG. 2A, the seal assembly 202 may include a plurality of seal segments 216 that respectively have a semiannular configuration. The plurality of seal segments 216 may be disposed circumferentially adjacent to one another. The plurality of seal segments 216 may be coupled to one another at corresponding segment interfaces 218. The segment interfaces 218 may be located at least in part at a radial edge of circumferentially adjacent seal segments 216. Additionally, or in the alternative, in some embodiments, as shown in FIG. 2B, a seal assembly 202 may include one seal segment 216 that has an annular configuration. It will be appreciated that unless expressly stated otherwise, the present disclosure is applicable to seal assemblies 202 regardless of whether the seal assembly 202 includes a plurality of seal segments 216 that respectively have a semiannular configuration or one seal segment 216 that has an annular configuration.

As shown in FIGS. 2A and 2B, the seal assembly 202 may be coupled to a stator interface 220. The stator interface 220 may remain stationary relative to the one or more seal segments 216. In some embodiments, the stator interface 220 may define a portion of the seal assembly 202. The stator interface 220 may be coupled to a portion of the rotary machine 200 that remains stationary relative to the stator interface 220. Additionally, or in the alternative, the stator interface 220 may define a portion of the rotary machine 200 that remains stationary relative to the seal assembly 202. For example, the stator interface 220 may be coupled to a portion of the engine case 114, or the stator interface 220 may define a portion of the engine case 114. As another example, the stator interface 220 may be coupled to the HP shaft 136, or the stator interface 220 may define a portion of the HP shaft 136. The one or more seal segments 216 may circumferentially surround a perimeter of the rotor 204 such that the seal face 212 and the rotor face 214 have a coaxial orientation with respect to the axis of rotation 210. The rotor 204 may define a portion of the rotary machine 200, such as a portion of the turbine engine 100. For example, the rotor 204 may define a portion of the HP spool 140 and/or a portion of the HP shaft 136 of the turbine engine 100. As another example, the rotor 204 may define a portion of the LP spool 142 and/or a portion of the LP shaft 138 of the turbine engine 100.

In some embodiments, as shown in FIGS. 2A and 2B, the seal assembly 202 may be disposed radially outward from the rotor 204 of the rotary machine 200 relative to a radial axis 222. The seal assembly 202 may circumferentially surround a perimeter of the rotor 204 that faces radially outward relative to the radial axis 222, such as the rotor face 214. That the rotor 204 may rotate about a radially inward portion of the seal assembly 202, such as the seal face 212. Alternatively, in some embodiments, the seal assembly 202 may be disposed radially inward from the rotor 204, and the stator interface 220 may be coupled to a radially inward portion of the seal assembly 202. In such a configuration, the seal assembly 202 may circumferentially surround a radially inward perimeter of the rotor 204, such as a radially inward-facing rotor face 214, and the rotor 204 may rotate about a radially outward portion of the seal assembly 202, such as a radially outward-facing seal face 212. For example, the stator interface 220 may be coupled to, or may define a portion of, the LP spool 142 and/or a portion of the LP shaft 138. Additionally, or in the alternative, the rotor 204 may define a portion of the HP spool 140 and/or a portion of the HP shaft 136. It will be appreciated that unless expressly stated otherwise, the present disclosure is applicable to seal assemblies 202 regardless of whether the seal assembly 202 circumferentially surrounds a radially inward perimeter or a radially outward perimeter of a rotor 204.

Figure 3A:
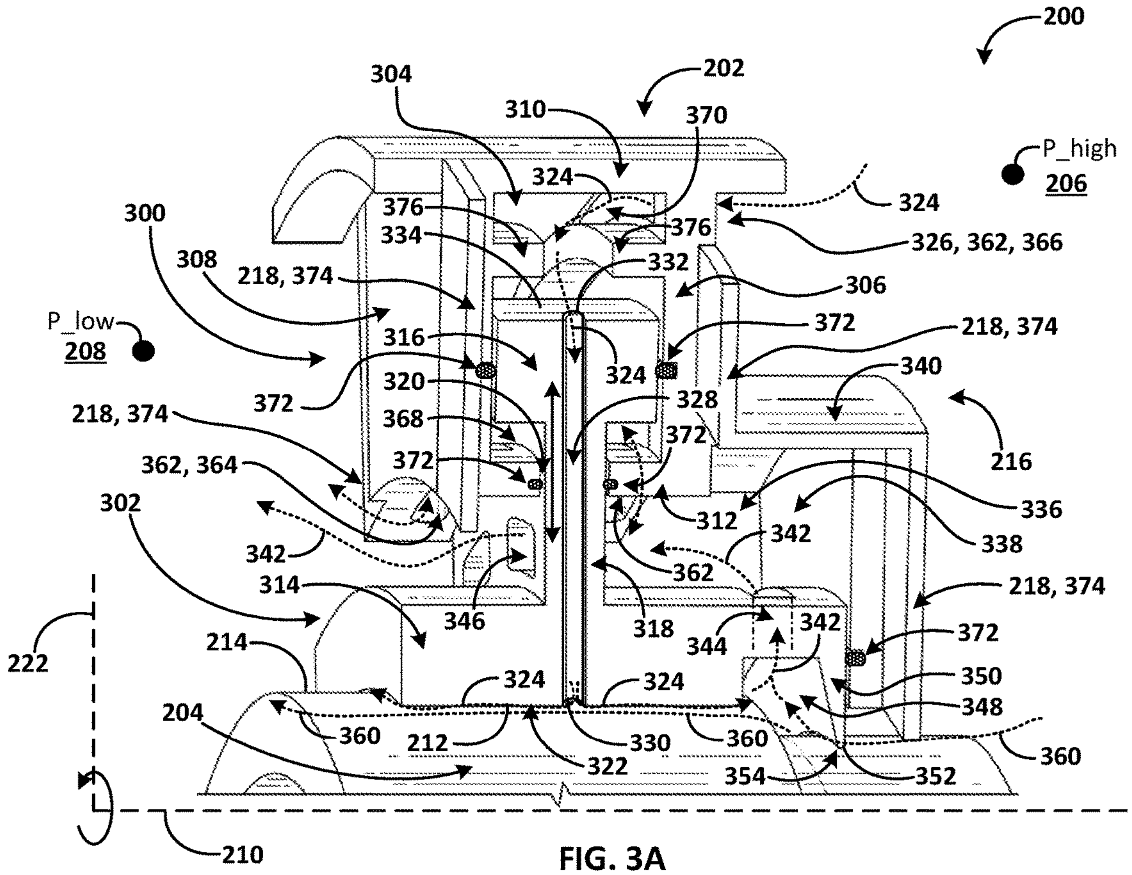
FIGS. 3A and 3B show a schematic side view and a schematic perspective view, respectively, of an exemplary seal element of a seal assembly.
Figure 3B:
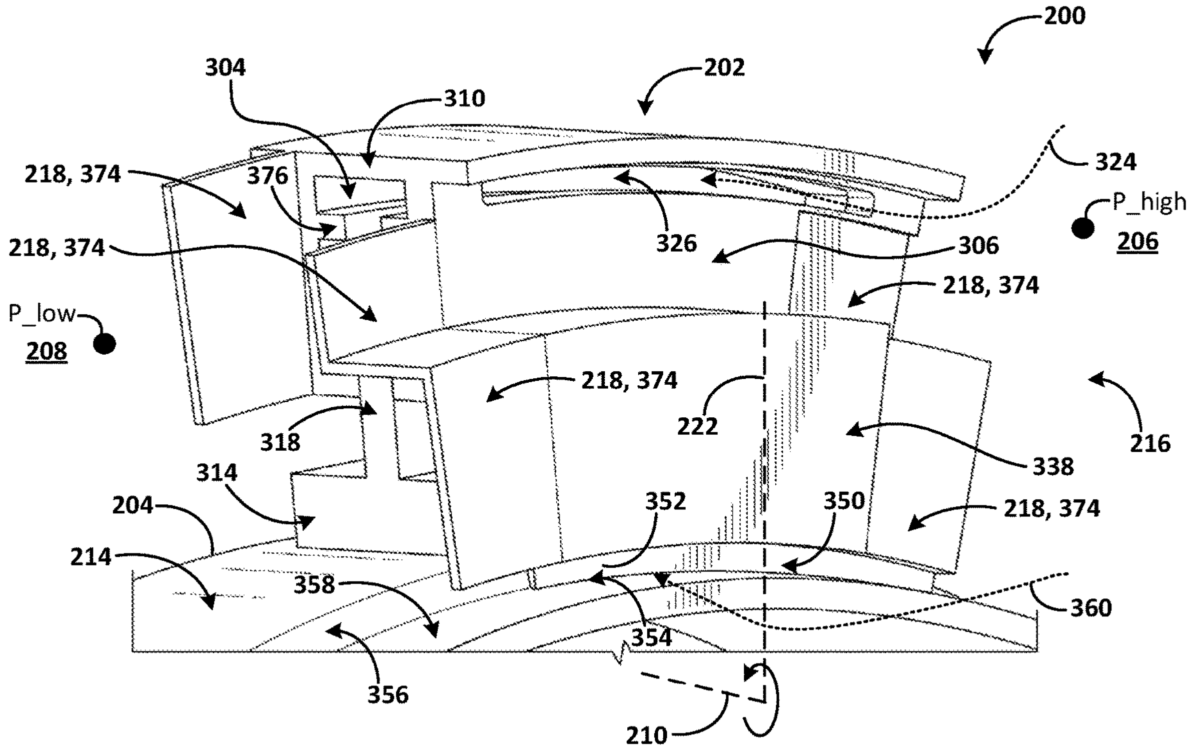

Referring now to FIGS. 3A and 3B, exemplary seal assemblies 202 are further described. A seal assembly 202 may include one or more seal segments 216. FIGS. 3A and 3B show an exemplary seal segment 216. As shown, a seal segment 216 may include a seal housing 300 and one or more seal bodies 302. For a seal assembly 202 that includes a plurality of seal segments 216, as shown, for example, in FIG. 2A, the plurality of seal segments 216 may respectively include one seal housing 300 and one or more seal bodies 302. For a seal assembly 202 that includes one seal segment 216, the seal segment 216 may include one seal housing 300 and a plurality of seal bodies 302. The seal housing 300 may define a seal chamber 304 that receives at least a portion of the one or more seal bodies 302. In some embodiments, a seal housing 300 and/or a seal body 302 may respectively have a monolithic structure. Additionally, or in the alternative, a seal housing 300 and/or a seal body 302 may be formed of a plurality of elements joined together with one another. It will be appreciated that reference herein to respective portions of a seal housing 300 and/or to respective portions a seal body 302 may refer to regions of a monolithic structure and/or to separate elements that may be joined together to for the respectively seal housing 300 or seal body 302, as appliable.

The seal segment 216 shown in FIGS. 3A and 3B has a semiannular configuration. A seal assembly 202 may include a plurality of seal segments 216 configured as shown in FIGS. 3A and 3B. It will be appreciated that a seal segment 216 may also have an annular configuration, for example, as shown in FIG. 2B. With respect to the configuration shown in FIG. 2B, the seal segment 216 shown in FIGS. 3A and 3B may generally be considered as a partial cutaway view of a seal segment 216 that correspondingly has an annular configuration.

For a seal assembly 202 that includes a plurality of seal segments 216 that generally have a semiannular configuration, as shown for example, in FIG. 2A, the plurality of seal segments 216 may respectively include a seal housing 300 that generally has a semiannular configuration. A seal assembly 202 may include a plurality of seal housings 300 disposed circumferentially adjacent to one another, for example, corresponding to respective seal segments 216. Respective ones of the plurality of seal segments 216 may include one or more seal bodies 302. In some embodiments, a seal housing 300 that has a semiannular configuration may include a plurality of seal bodies 302. Such a plurality of seal bodies 302 may be disposed circumferentially adjacent to one another.

For a seal assembly 202 that includes one seal segment 216 that has an annular configuration, as shown for example, in FIG. 2B, the seal segment 216 may include one seal housing 300 that has an annular configuration. Additionally, or in the alternative, some embodiments, a plurality of seal housings 300 may be coupled to one another by way of a press-fit, welding, brazing, a retaining ring, bolts, or other suitable attachment hardware, for example, in connection with assembling a plurality of seal segments 216 and/or to form a seal housing 300 that has an annular configuration. Such an annular seal segment 216 may include a plurality of seal bodies 302 that have a semi annular configuration corresponding to the annular seal housing 300.

The seal housing 300 may be secured to a stator interface 220 (FIGS. 2A and 2B), such as by way of a press-fit, welding, brazing, a retaining ring, bolts, or other suitable attachment hardware. Additionally, or in the alternative, the seal housing 300 may be coupled to the stator interface 220 by way of one or more seating elements (not shown) disposed about the stator interface 220 and/or the seal housing 300. The one or more seating elements may include one or more recesses, grooves, ridges, notches, threads, or the like. The seal housing 300 may be secured to the stator interface 220 or may float in position relative to the stator interface 220.

The seal housing 300 may include a laterally-distal sidewall 306 and a laterally-proximal sidewall 308 that are laterally opposed to one another along the axis of rotation of the rotor 204. The laterally-distal sidewall 306 may be located towards the inlet plenum 206 with respect to the axis of rotation 210 of the rotor 204. The laterally-proximal sidewall 308 may be located towards the outlet plenum 208 with respect to the axis of rotation 210 of the rotor 204. At least a portion of the seal chamber 304 may be disposed between the laterally-distal sidewall 306 and the laterally-proximal sidewall 308. Additionally, or in the alternative, the seal chamber 304 may be defined at least in part by the laterally-distal sidewall 306 and the laterally-proximal sidewall 308. The laterally-distal sidewall 306 and/or the laterally-proximal sidewall 308 may be oriented transverse to the axis of rotation 210 of the rotor 204, such as perpendicular to the axis of rotation 210. As shown in FIGS. 3A and 3B, the laterally-distal sidewall 306 and/or the laterally-proximal sidewall 308 may be oriented parallel to the radial axis 222. In other embodiments, the laterally-distal sidewall 306 and/or the laterally-proximal sidewall 308 may be oriented oblique to the radial axis 222.

The seal housing 300 may include a radially-distal wall 310 and a radially-proximal wall 312. In relation to the radially-proximal wall, the radially-distal wall 310 may be located towards the stator interface 220 (FIGS. 2A and 2B) with respect to the radial axis 222. At least a portion of the seal chamber 304 may be disposed between the radially-distal wall 310 and the radially-proximal wall 312. Additionally, or in the alternative, the seal chamber 304 may be defined at least in part by the radially-distal wall 310 and the radially-proximal wall 312. In relation to the radially-distal wall 310, the radially-proximal wall 312 may be located towards the rotor 204 with respect to the radial axis 222. The radially-distal wall 310 and/or the radially-proximal wall 312 may be oriented coaxially to the axis of rotation 210 of the rotor 204, such as parallel to the axis of rotation 210. As shown in FIGS. 3A and 3B, the radially-distal wall 310 and/or the radially-proximal wall 312 may be oriented perpendicular to the radial axis 222. In other embodiments, the radially-distal wall 310 and/or the radially-proximal wall 312 may be oriented oblique to the radial axis 222. The radially-distal wall 310 may be monolithically integrated with, or coupled to, the laterally-distal sidewall 306 and/or the laterally-proximal sidewall 308. Additionally, or in the alternative, the radially-proximal wall 312 may be monolithically integrated with, or coupled to, the laterally-distal sidewall 306 and/or the laterally-proximal sidewall 308.

The seal body 302 may include a rotor shoe 314 and a piston head 316. In some embodiments, the seal body may include a flange 318 extending between the rotor shoe 314 and the piston head 316, as shown, for example, in FIGS. 3A and 3B. The rotor shoe 314 may be monolithically integrated with, or coupled to, the flange 318. Additionally, or in the alternative, the flange 318 may be monolithically integrated with, or coupled to, the piston head 316. In other embodiments, the rotor shoe 314 may be monolithically integrated with, or coupled to, the piston head 316. For example, the piston head 316 may define a portion of the flange 318, or the seal body may include a rotor shoe 314 and a piston head 316 without a flange 318.

The rotor shoe 314 may be oriented radially proximal to the rotor 204 in relation to the radial axis 222. Additionally, or in the alternative, the rotor shoe 314 may be oriented radially distal from the seal housing 300 in relation to the radial axis 222. The piston head 316 may be oriented radially proximal to the seal housing 300 in relation to the radial axis 222. Additionally, or in the alternative, the piston head 316 may be oriented radially distal from the rotor 204 in relation to the radial axis 222.

The seal body 302 may move along the radial axis 222 in relation to the seal housing 300. Movements of the seal body 302 in relation to the seal housing 300 may be attributable to motive forces coinciding with transient operating conditions, such as a change in pressure or pressure difference with respect to the inlet plenum 206 and the outlet plenum 208, and/or thermal expansion or contraction of the seal assembly 202 and/or of one or more components of the rotary machine 200, and/or speed-change-induced centrifugal growth of the rotor 204. Additionally, or in the alternative, the seal body 302 may move along the radial axis 222 responsive to aberrant movement of the rotor 204. Additionally, or in the alternative, a position of the seal body 302 in relation to the seal housing 300 with respect to the radial axis 222 may correspond to relatively steady state operating conditions. The specific location of the seal body 302 with respect to the radial axis 222 may fluctuate with motive forces coinciding to incidental operating perturbations and/or aberrant movement of the rotor 204 that may occur during steady state operating conditions.

The seal chamber 304 may receive at least a portion of the seal body 302, including at least a portion of the piston head 316. In some embodiments, the seal chamber 304 may receive at least a portion of the flange 318. The piston head 316 may move radially within the seal chamber 304 in relation to the radial axis 222, for example, responsive to transient operating conditions and/or aberrant movement of the rotor 204. The piston head 316 may be configured and arranged to slidably engage with the seal chamber 304, such as with a piston head-facing surface of the laterally-distal sidewall 306 and/or with a piston head-facing surface of the laterally-proximal sidewall 308. An axial width of the piston head 316 and an axial width of the seal chamber 304 in relation to the axis of rotation 210 of the rotor 204 may be configured with suitable dimensional tolerance. In some embodiments, at least a portion of the flange 318 may extend into the seal chamber 304, for example, with radial movement of the seal body 302.

The seal housing 300 may include a seal body channel 320 that receives at least a portion of the seal body 302. The seal body channel 320 may extend through the radially-proximal wall 312 of the seal housing 300. As shown in FIGS. 3A and 3B, the seal body channel 320 may receive the flange 318. In other embodiments, such as when the seal body 302 includes a rotor shoe 314 monolithically integrated with, or coupled to, a piston head 316, the seal body channel 320 may receive the piston head 316. The seal body 302, such as the flange 318 of the seal body 302, may move radially within the seal body channel 320 in relation to the radial axis 222, for example, responsive to transient operating conditions and/or aberrant movement of the rotor 204, thereby moving the piston head 316 radially within the seal chamber 304. The flange 318 may be configured and arranged to slidably engage with the seal body channel 320. An axial width of the flange 318 and an axial width of the seal body channel 320 in relation to the axis of rotation 210 of the rotor 204 may be configured with suitable dimensional tolerance.

The rotor shoe 314 may include a seal face 212 that provides a non-contacting interface with a rotor face 214 of a rotor 204. The non-contacting interface may include a fluid-bearing gap 322 between the seal face 212 and the rotor face 214. Pressurized fluid within the fluid-bearing gap 322 may provide a fluid bearing, such as a gas bearing, that inhibits contact between the seal face 212 and the rotor face 214. Radial movement of seal body 302, such as responsive to transient operating conditions and/or aberrant movement of the rotor 204, may maintain a suitable dimension of the fluid-bearing gap 322, thereby providing proper functioning of fluid bearing and/or inhibiting contact between the seal face 212 and the rotor face 214.

The seal assembly 202 may include a primary leakage path 324. The primary leakage path 324 may supply fluid to the fluid-bearing gap 322. Fluid that follows the primary leakage path 324 may flow from the inlet plenum 206 to the fluid-bearing gap 322. The primary leakage path 324 may be defined at least in part by the fluid-bearing gap 322. Fluid in the fluid-bearing gap 322 may flow from the fluid-bearing gap 322 to the outlet plenum 208. The seal housing 300 may include one or more fluid supply apertures 326. The one or more fluid supply apertures 326 may include one or more channels, conduits, passages, or the like that pass through the seal housing 300. The one or more fluid supply apertures 326 may traverse laterally through the seal housing 300 in relation to an axis of rotation of the rotary machine 200. The one or more fluid supply apertures 326 may be defined by a monolithic structure of the seal housing 300. The one or more fluid supply apertures 326 may define at least a portion of the primary leakage path 324. The seal body 302 may include one or more fluid conduits 328. The one or more fluid conduits 328 may include one or more channels, conduits, passages, or the like that pass through the seal body 302. The one or more fluid conduits 328 may traverse radially through the seal body 302. The one or more fluid conduits 328 may be defined by a monolithic structure of the seal body. The one or more fluid conduits may define at least a portion of the primary leakage path 324.

The one or more fluid supply apertures 326 may fluidly communicate with the one or more fluid conduits 328. The one or more fluid supply apertures 326 may provide fluid communication between the region of inlet plenum 206 and the one or more fluid conduits 328. Additionally, or in the alternative, the one or more fluid supply apertures 326 may fluidly communicate with the seal chamber 304. The one or more fluid supply apertures 326 may provide fluid communication between the region of inlet plenum 206 and the seal chamber 304. The seal chamber 304 may fluidly communicate with the one or more fluid conduits 328. In some embodiments, the seal chamber 304 may define at least a portion of the primary leakage path 324. In some embodiments, the primary leakage path 324 may include one or more fluid supply apertures 326, the seal chamber 304, and one or more fluid conduits 328. The one or more fluid conduits 328 may fluidly communicate with the fluid-bearing gap 322. The fluid-bearing gap 322 may fluidly communicate with the region of outlet plenum 208.

As shown in FIGS. 3A and 3B, the one or more fluid supply apertures 326 may pass through a laterally-distal sidewall 306 of the seal housing 300.
Additionally, or in the alternative, the one or more fluid supply apertures 326 may pass through a radially-distal wall 310 of the seal housing 300. The laterally-distal sidewall 306 and or the radially-distal wall 310 may define at least a portion of the one or more fluid supply apertures 326. In some embodiments, as shown in FIG. 3B, the one or more fluid supply apertures 326 may have an elongate and/or semiannular shape.

As shown in FIG. 3A, the one or more fluid conduits 328 of the seal body 302 may extend through at least a portion of the piston head 316 and/or at least a portion of the rotor shoe 314. Additionally, or in the alternative, the one or more fluid conduits 328 may extend through at least a portion of the flange 318 of the seal body 302. The one or more fluid conduits 328 may respectively fluidly communicate with the fluid-bearing gap 322 between the seal face 212 and the rotor face 214 at one or more orifices that define a radially-proximal opening 330 of the respective fluid conduit 328 in relation to the radial axis 222. The radially-proximal opening 330 may be disposed about a surface of the rotor shoe 314. For example, as shown in FIG. 3A, the radially-proximal opening 330 may be disposed about the seal face 212, such that the fluid conduit 328 provides fluid directly to the fluid-bearing gap 322. In other embodiments, a fluid conduit 328 may fluidly communicate with a groove or channel within the seal body 302 and/or the rotor shoe 314, and such groove or channel may provide fluid communication with the fluid-bearing gap 322. Additionally, or in the alternative, the one or more fluid conduits 328 may respectively fluidly communicate with the seal chamber 304 at a radially distal opening 332 of the respective fluid conduit 328 in relation to the radial axis 222. For example, as shown in FIG. 3A, the radially distal opening 332 of a respective fluid conduit 328 may be disposed about a surface of the piston head 316, such as a radially-distal surface 334 of the piston head 316. In other embodiments, a fluid conduit 328 may fluidly communicate with a groove or channel within the seal body 302 and/or the rotor shoe 314, and such groove or channel may provide fluid communication with the fluid-bearing gap 322.

In some embodiments, the seal assembly 202 may include an ancillary seal chamber 336. The ancillary seal chamber 336 may be defined at least in part by the seal housing 300. The seal housing 300 may include an ancillary forward wall 338. The ancillary seal chamber 336 may be defined at least in part by the ancillary forward wall 338 and the seal body 302. Additionally, or in the alternative, at least a portion of the ancillary seal chamber 336 may be disposed between the ancillary forward wall 338 and the seal body 302. The ancillary forward wall 338 may be located towards the inlet plenum 206 relative to the seal body 302. The ancillary forward wall 338 may be oriented transverse to the axis of rotation 210 of the rotor 204, such as perpendicular to the axis of rotation 210. As shown in FIGS. 3A and 3B, the ancillary forward wall 338 may be oriented parallel to the radial axis 222. In other embodiments, the ancillary forward wall 338 may be oriented oblique to the radial axis 222.

In some embodiments, the seal housing 300 may include an ancillary axial wall 340 disposed between the laterally-distal sidewall 306 and the ancillary forward wall 338. The ancillary axial wall 340 may be oriented coaxially to the axis of rotation 210 of the rotor 204, such as parallel to the axis of rotation 210. As shown in FIGS. 3A and 3B, the ancillary axial wall 340 may be oriented perpendicular to the radial axis 222. In other embodiments, the ancillary axial wall 340 may be oriented oblique to the radial axis 222. The ancillary axial wall 340 may be monolithically integrated with, or coupled to, the laterally-distal sidewall 306 and/or the ancillary forward wall 338. In other embodiments, the ancillary forward wall 338 may define a portion of the laterally-distal sidewall 306. For example, the ancillary forward wall 338 may be monolithically integrated with, or coupled to, the laterally-distal sidewall 306. Additionally, or in the alternative, the ancillary forward wall 338 may extend from the laterally-distal sidewall 306, such as with a parallel or oblique orientation relative to the laterally-distal sidewall 306.

The ancillary seal chamber 336 may receive at least a portion of the seal body 302, such as at least a portion of the rotor shoe 314. The rotor shoe 314 may move radially within the ancillary seal chamber 336 in relation to the radial axis 222, for example, responsive to transient operating conditions and/or aberrant movement of the rotor 204. The rotor shoe 314 may be configured and arranged to slidably engage with the ancillary seal chamber 336, such as with a rotor shoe-facing surface of the ancillary forward wall 338. An axial width of the rotor shoe 314 and an axial width of the ancillary seal chamber 336 in relation to the axis of rotation 210 of the rotor 204 may be configured with suitable dimensional tolerance.

In some embodiments, the seal assembly 202 may include a vent path 342. The vent path 342 may receive fluid from the fluid-bearing gap 322 and to discharge the fluid to the outlet plenum 208. Fluid that follows the vent path 342 may flow from the fluid-bearing gap 322 to the ancillary seal chamber 336. The vent path 342 may be defined at least in part by the ancillary seal chamber 336. Fluid in the ancillary seal chamber 336 may flow from the ancillary seal chamber 336 to the outlet plenum 208. The seal body 302, such as the rotor shoe 314, may include one or more vent conduits 344. The one or more vent conduits 344 may include one or more channels, conduits, passages, or the like that pass through the rotor shoe 314 downstream from the fluid-bearing gap 322. The one or more vent conduits 344 may be defined by a monolithic structure of the seal body 302, and/or by a monolithic structure of the rotor shoe 314. The one or more vent conduits 344 may define at least a portion of the vent path 342. The one or more vent conduits 344 may fluidly communicate with the ancillary seal chamber 336. The one or more vent conduits 344 may provide fluid communication between the fluid-bearing gap 322 and the ancillary seal chamber 336.

In addition, or in the alternative to the one or more vent conduits 344, the seal body 302 may include one or more crossover conduits 346. In some embodiments, the vent path 342 may include one or more vent conduits 344, the ancillary seal chamber 336, and one or more crossover conduits 346. The one or more crossover conduits 346 may include one or more channels, conduits, passages, or the like that pass through the seal body 302 downstream from the fluid-bearing gap 322. For example, as shown in FIG. 3A, the one or more crossover conduits 346 may pass through the flange 318 of the seal body 302. In other embodiments, the one or more crossover conduits 346 may pass through the rotor shoe 314. Additionally, or in the alternative, the one or more crossover conduits 346 may pass through the piston head 316, for example, in embodiments of a seal body 302 that include a piston head 316 monolithically integrated with, or coupled to, the rotor shoe 314. The one or more crossover conduits 346 may be defined by a monolithic structure of the seal body 302, such as by a monolithic structure of the flange 318 and/or of another respective portion of the seal body 302. The one or more crossover conduits 346 may define at least a portion of the vent path 342. The one or more crossover conduits 346 may fluidly communicate with the outlet plenum 208. As shown in FIG. 3A, the one or more crossover conduits 346 may provide fluid communication between the ancillary seal chamber 336 and the outlet plenum 208. Additionally, or in the alternative, the one or more crossover conduits 346 may provide fluid communication between the fluid-bearing gap 322 and the outlet plenum 208. For example, a seal body 302 may include one or more crossover conduits 346 that bypass the ancillary seal chamber 336, and/or a seal assembly 202 may be provided that does not include an ancillary seal chamber 336.

In some embodiments, a seal assembly 202 may include an expansion chamber 348. The expansion chamber 348 may be defined at least in part by the rotor shoe 314 of the seal body 302. The expansion chamber 348 may be disposed downstream from the fluid-bearing gap 322. The expansion chamber 348 may receive fluid from the fluid-bearing gap 322 and to discharge the fluid to the outlet plenum 208. The expansion chamber 348 may define at least a portion of the vent path 342. In some embodiments, the expansion chamber 348 may be disposed upstream from one or more vent conduits 344. The expansion chamber 348 may fluidly communicate with the one or more vent conduits 344. Additionally, or in the alternative, the expansion chamber 348 may define at least a portion of a vent conduit 344. Additionally, or in the alternative, the expansion chamber 348 may fluidly communicate with the ancillary seal chamber 336. Additionally, or in the alternative, the expansion chamber 348 may fluidly communicate with the outlet plenum 208. As shown in FIG. 3A, fluid may flow from the fluid-bearing gap 322 to the expansion chamber 348. Fluid in the expansion chamber 348 may flow through one or more vent conduits 344 to the ancillary seal chamber 336. Fluid in the ancillary seal chamber 336 may flow through one or more crossover conduits 346 to the outlet plenum 208. Additionally, or in the alternative, the one or more crossover conduits 346 may be configured to balance lateral forces on seal body 302. For example, as pressure changes within the outlet plenum 208 and/or within the ancillary seal chamber 336, fluid may flow correspondingly therebetween.

In some embodiments, the seal body 302 may include a laterally-distal seal wall 350. The laterally-distal seal wall 350 may be monolithically integrated with, or coupled to, the seal body 302, such as the rotor shoe 314. Additionally, or in the alternative, the laterally-distal seal wall 350 may be defined at least in part by the rotor shoe 314. In relation to the rotor shoe 314, the laterally-distal seal wall 350 may be located towards the inlet plenum 206 with respect to the axis of rotation 210. At least a portion of the expansion chamber 348 may be disposed between the laterally-distal seal wall 350 and the rotor shoe 314, such as an expansion chamber-facing surface of the rotor shoe 314. Additionally, or in the alternative, the expansion chamber 348 may be defined at least in part by the laterally-distal seal wall 350 and the rotor shoe 314, such as the expansion chamber-facing surface of the rotor shoe 314. The laterally-distal seal wall 350 may be oriented transverse to the axis of rotation 210 of the rotor 204, such as perpendicular to the axis of rotation 210. As shown in FIG. 3A, the laterally-distal seal wall 350 may be oriented parallel to the radial axis 222. In other embodiments, the laterally-distal seal wall 350 may be oriented oblique to the radial axis 222.

The ancillary seal chamber 336 may receive at least a portion of the laterally-distal seal wall 350, such as at least a portion of the rotor shoe 314 defined by the laterally-distal seal wall 350. The laterally-distal seal wall 350 may move radially within the ancillary seal chamber 336 in relation to the radial axis 222, for example, responsive to transient operating conditions and/or aberrant movement of the rotor 204. The laterally-distal seal wall 350 may be configured and arranged to slidably engage with the ancillary seal chamber 336, such as with a rotor shoe-facing surface of the ancillary forward wall 338. An axial width of the laterally-distal seal wall 350 and an axial width of the ancillary seal chamber 336 in relation to the axis of rotation 210 of the rotor 204 may be configured with suitable dimensional tolerance.

The laterally-distal seal wall 350 may include one or more teeth 352 that provide a forward seal interface 354 with the rotor 204. The forward seal interface 354 between the one or more teeth 352 and the rotor 204 may include a non-contacting interface. The forward seal interface 354 provided by the laterally-distal seal wall 350 and/or the one or more teeth 352 thereof may inhibit fluid flow from the inlet plenum 206 into the expansion chamber 348 and/or into the fluid-bearing gap 322. In some embodiments, and/or during some operating conditions, as between the one or more fluid supply apertures 326 and the forward seal interface 354, fluid in the inlet plenum 206 may preferentially flow into the one or more fluid supply apertures 326. The preferential flow into the one or more fluid supply apertures 326 may be attributable at least in part to the forward seal interface 354.

In some embodiments, the rotor 204 may include a step 356, as shown, for example, in FIG. 3B. The step 356 may define a change in the circumference of the rotor 204, for example, in relation to the radial axis 222. In relation to the step 356, the rotor face 214, the seal face 212, and/or the fluid-bearing gap 322 between the rotor face 214 and the seal face 212, may be located towards the outlet plenum 208 with respect to the axis of rotation 210 of the rotor 204. Additionally, or in the alternative, in relation to the step 356, the laterally-distal seal wall 350 and/or the forward seal interface 354 may be located towards the inlet plenum 206 with respect to the axis of rotation 210. For example, the step 356 may be located between the laterally-distal seal wall 350 and the rotor face 214 with respect to the axis of rotation 210. Additionally, or in the alternative, the rotor face 214 may be defined at least in part by the portion of the rotor 204 located towards the outlet plenum 208 with respect to the axis of rotation 210. In some embodiments, the rotor 204 may include a laterally-distal rotor face 358. The laterally-distal rotor face 358 may be defined at least in part by the portion of the rotor 204 located towards the inlet plenum 206 with respect to the axis of rotation 210. Additionally, or in the alternative, the laterally-distal rotor face 358 may coincide with the one or more teeth 352 of the laterally-distal seal wall 350. The forward seal interface 354 may be defined at least in part by the laterally-distal rotor face 358.

In some embodiments, as shown, for example, in FIG. 3A, the step 356 may coincide with a location of the expansion chamber 348 and/or the expansion chamber-facing wall of the rotor shoe 314. In relation to the step 356, at least a portion of the expansion chamber may be located towards the inlet plenum 206 with respect to the axis of rotation 210. Additionally, or in the alternative, the step 356 may be located towards the inlet plenum 206 in relation to the rotor shoe 314, such as the expansion chamber-facing wall of the rotor shoe 314. Additionally, or in the alternative, the step 356 may define at least a portion of the expansion chamber 348.

In some embodiments, the seal assembly 202 may include a secondary leakage path 360. The secondary leakage path 360 may supply fluid to the fluid-bearing gap 322 in addition, or in the alternative, to the primary leakage path 324. Fluid that follows the secondary leakage path 360 may flow from the inlet plenum 206 to the fluid-bearing gap 322 and/or to the one or more vent conduits 344. Fluid in the fluid-bearing gap 322 may flow from the fluid-bearing gap 322 to the outlet plenum 208. The secondary leakage path 360 may be defined at least in part by the forward seal interface 354. The secondary leakage path 360 may be defined at least in part by the expansion chamber 348. The secondary leakage path 360 may be defined at least in part by the fluid-bearing gap 322. As shown in FIG. 3A, the secondary leakage path 360 may include the forward seal interface 354, the expansion chamber 348, and the fluid-bearing gap 322. The inlet plenum 206 may fluidly communicate with the expansion chamber 348 at least in part by the forward seal interface 354. The expansion chamber 348 may fluidly communicate with the fluid-bearing gap 322.

In some embodiments, pressurized fluid within the fluid-bearing gap 322 may be provided by the primary leakage path 324, by the secondary leakage path 360, and or by both the primary leakage path 324 and the secondary leakage path 360, depending, for example, on one or more operating conditions of the rotary machine 200. Additionally, or in the alternative, whether the pressurized fluid within the fluid-bearing gap 322 is provided by the primary leakage path 324, the secondary leakage path 360, and or both the primary leakage path 324 and the secondary leakage path 360 may depend at least in part on a position of the seal body 302 along the radial axis 222 relative to the rotor 204 and/or relative to the seal housing 300. As the seal body 302 moves towards the seal housing 300 and/or away from the rotor 204 with respect to the radial axis, the radial width of the fluid-bearing gap 322 may increase and/or the radial width of the forward seal interface 354 may increase. As the seal body 302 moves towards the rotor 204 and/or away from the seal housing 300 with respect to the radial axis, the radial width of the fluid-bearing gap 322 may decrease and/or the radial width of the forward seal interface 354 may decrease. In some embodiments, when the fluid-bearing gap 322 and/or the forward seal interface 354 has a relatively large radial width, at least a portion of the pressurized fluid within the fluid-bearing gap 322 may be provided by the secondary leakage path 360. As the radial width of the fluid-bearing gap 322 and/or the forward seal interface 354 decreases, fluid flow along the secondary leakage path 360 may decrease and/or fluid flow along the primary leakage path 324 may increase.

In some embodiments, the seal housing 300 may include one or more seal body-positioning vents 362. The one or more seal body-positioning vents 362 may supply fluid to and/or from the seal chamber 304. Fluid supplied to and/or from the seal chamber 304 by the one or more seal body-positioning vents 362 may cause the seal body 302 to move along the radial axis 222 in relation to the seal housing 300, for example, by the fluid exerting a force on the portion of the seal body 302 within the seal chamber 304, such as the piston head 316. The one or more seal body-positioning vents 362 may include one or more outlet plenum-positioning vents 364 and/or one or more inlet plenum-positioning vents 366.

The one or more outlet plenum-positioning vents 364 may provide fluid communication between a proximal region 368 of the seal chamber 304 and the outlet plenum 208. The proximal region 368 of the seal chamber 304 may be located between, and/or defined at least in part by, the radially-proximal wall 312 of the seal housing 300 and a portion of the seal body 302 disposed within the seal chamber 304, such as the piston head 316. As shown in FIG. 3A, the one or more outlet plenum-positioning vents 364 may be disposed about the radially-proximal wall 312 of the seal housing 300. For example, the radially-proximal wall 312 may include one or more outlet plenum-positioning vents 364 on respectively opposite sides of the seal body 302 in relation to the axis of rotation 210 of the rotary machine 200. Additionally, or in the alternative, one or more outlet plenum-positioning vents 364 may be disposed about the laterally-proximal sidewall 308 of the seal housing 300.

Additionally, or in the alternative, the one or more inlet plenum-positioning vents 366 provide fluid communication between a distal region 370 of the seal chamber 304 and the inlet plenum 206. The distal region 370 of the seal chamber 304 may be located between, and/or defined at least in part by, the radially-distal wall 310 of the seal housing 300 and a portion of the seal body 302 disposed within the seal chamber 304, such as the piston head 316. As shown in FIG. 3A, the one or more inlet plenum-positioning vents 366 may be disposed about the laterally-distal sidewall 306 of the seal housing 300. Additionally, or in the alternative, one or more inlet plenum-positioning vents 366 may be disposed about the radially-distal wall 310 of the seal housing 300.

In some embodiments, the one or more inlet plenum-positioning vents 366 may include the one or more fluid supply apertures 326. Additionally, or in the alternative, the seal housing 300 may include one or more inlet plenum-positioning vents 366 separately from, and in addition to, the one or more fluid supply apertures 326. For example, in some embodiments, as shown, for example, with reference to FIGS. 5A and 5B, the seal housing 300 may include one or more fluid supply apertures 326 located at an axially proximal position of the seal housing 300 relative to the distal region 370 of the seal chamber 304. Such fluid supply apertures 326 may fluidly communicate with the proximal region 368 of the seal chamber 304 and/or with one or more fluid conduits 328 defined by the seal body 302. The seal housing 300 may include one or more inlet plenum-positioning vents 366 in addition to the one or more fluid supply apertures 326 located at an axially proximal position of the seal housing 300 relative to the distal region 370 of the seal chamber 304.

During operation of the rotary machine 200, the seal body 302 may move along the radial axis 222 in relation to the seal housing 300 and/or the rotor 204 depending at least in part on one or more operating conditions. In some embodiments, the position of the seal body 302 in relation to the seal housing 300 and/or the rotor 204 with respect to the radial axis 222 may depend at least in part on a pressure of the fluid in the inlet plenum 206, a pressure of the fluid in the outlet plenum 208, and/or a pressure difference between the inlet plenum 206 and the outlet plenum 208.

In some embodiments, a position of the seal body 302 in relation to the seal housing 300 and/or the rotor 204 may depend upon, and/or may be balanced based at least in part on, such pressure and/or such pressure difference with respect to the inlet plenum 206 and the outlet plenum 208. Additionally, or in the alternative, the position of the seal body 302 in relation to the seal housing 300 and/or the rotor 204 with respect to the radial axis 222 may depend upon, and/or may be balanced based at least in part on, a rotational speed of the rotor 204. Such a pressure or pressure difference may depend at least in part on, and/or may be proportional to, a rotational speed of the rotor 204 and/or an operating condition of the rotary machine 200 corresponding to such rotational speed. Additionally, or in the alternative, such a pressure or pressure difference, and/or such a rotational speed, may correspond to, and/or may be proportional to an output power of the rotary machine 200.

As fluid flows from the inlet plenum 206 into the distal region 370 of the seal chamber 304, such as through the one or more inlet plenum-positioning vents 366, the fluid in the distal region 370 of the seal chamber 304 may impart a force upon the seal body 302, such as upon the piston head 316. The force imparted upon the seal body 302, such as upon the piston head 316, may cause the seal body 302 to move along the radial axis 222 in a proximal direction relative to the seal housing 300. As the piston head 316 moves in the proximal direction within the seal chamber 304, such as in response to a force imparted upon the piston head 316 by fluid in the distal region 370 of the seal chamber 304, the volume of the proximal region 368 of the seal chamber 304 may contract. Movement of the piston head 316 in the proximal direction may cause fluid in the proximal region 368 of the seal chamber 304 to flow through the one or more outlet plenum-positioning vents 364 and into the outlet plenum 208. Additionally, or in the alternative, fluid may flow from the outlet plenum 208 into the one or more outlet plenum-positioning vents 364 to the proximal region 368 of the seal chamber 304. For example, fluid may flow into the proximal region 368 of the seal chamber 304 by way of the one or more outlet plenum-positioning vents 364 as a result of an increase in pressure of the fluid in the outlet plenum 208, a decrease in pressure of the fluid in the inlet plenum 206, and/or a decrease in a pressure difference between the inlet plenum 206 and the outlet plenum 208.

As fluid flows from the outlet plenum 208 into the proximal region 368 of the seal chamber 304, such as through the one or more outlet plenum-positioning vents 364, the fluid in the proximal region 368 of the seal chamber 304 may impart a force upon the seal body 302, such as upon the piston head 316. The force imparted upon the seal body 302, such as upon the piston head 316, may cause the seal body 302 to move along the radial axis 222 in a distal direction relative to the seal housing 300. As the piston head 316 moves in the distal direction within the seal chamber 304, such as in response to a force imparted upon the piston head 316 by fluid in the proximal region 368 of the seal chamber 304, the volume of the distal region 370 of the seal chamber 304 may contract. Movement of the piston head 316 in the distal direction may cause fluid in the distal region 370 of the seal chamber 304 to flow through the one or more inlet plenum-positioning vents 366 and into the inlet plenum 206. Additionally, or in the alternative, movement of the piston head 316 in the distal direction may cause fluid in the distal region 370 of the seal chamber 304 to flow through the one or more fluid conduits 328 and into the fluid-bearing gap 322.

In some embodiments, one or more operating conditions of the rotary machine 200, such as a pressure and/or a pressure difference with respect to the inlet plenum 206 and the outlet plenum 208, and/or a rotational speed of the rotor 204, may correspond at least in part to a mission stage of the rotary machine 200. For example, during startup of a rotary machine 200, pressure, pressure differential, and/or rotational speed may be relatively low. Such pressure, pressure differential, and/or rotational speed may increase with increasing output power of the rotary machine. As another example, for a turbine engine 100 such as an aircraft engine, the turbine engine 100 may require a high output power during a mission stage that includes at least one of: takeoff, climbing, aggressive maneuvering, high-speed travel, rapid acceleration, and/or landing. Such a turbine engine 100 may require a relatively lower output power during a mission stage that includes at least one of: idling, taxiing, cruising, decelerating, and/or low speed travel. In some embodiments, the seal assembly 202 may be configured such that a position of the seal body 302 in relation to the seal housing 300 and/or the rotor 204 with respect to the radial axis 222 may correspond to one or more operating conditions and/or mission stages of the rotary machine 200. In some embodiments, the position of the seal body 302 in relation to the seal housing 300 and/or the rotor 204 may provide a fluid-bearing gap 322 with a radial width that depends at least in part on one or more operating conditions and/or mission stages of the rotary machine 200. Additionally, or in the alternative, the position of the seal body 302 in relation to the seal housing 300 and/or the rotor 204 may provide a suitable flow of fluid to the fluid-bearing gap 322 by way of the primary leakage path 324 and/or by way of the secondary leakage path 360. The radial width of the fluid-bearing gap 322 and/or the amount of fluid flow along the primary leakage path 324 and/or the secondary leakage path 360, may be selected at least in part to provide suitable sealing properties and/or non-contacting properties of the seal assembly 202. For example, the position of the seal body 302 in relation to the seal housing 300 and/or the rotor 204, and/or the corresponding radial width of the fluid-bearing gap 322 and/or fluid flow therethrough, may be selected at least in part to avoid excess leakage from the inlet plenum 206 to the outlet plenum 208. Additionally, or in the alternative, the position of the seal body 302 in relation to the seal housing 300 and/or the rotor 204, and/or the corresponding radial width of the fluid-bearing gap 322 and/or fluid flow therethrough, may be selected at least in part to inhibit contact between the rotor shoe 314 and the rotor 204, such as between the seal face 212 and the rotor face 214 and/or between the one or more teeth 352 of the laterally-distal seal wall 350 and the laterally-distal rotor face 358.

For example, the seal body 302 may be located at a first position in relation to the seal housing 300 and/or the rotor 204 when operating the rotary machine 200 with a first operating condition. The seal body 302 may be located at a second position in relation to the seal housing 300 and/or the rotor 204 when operating the rotary machine 200 with a second operating condition. The first operating condition and/or the second operating condition may correspond to a first pressure and/or pressure differential with respect to the inlet plenum 206 and/or the outlet plenum 208. Additionally, or in the alternative, the first operating condition and/or the second operating condition may correspond to a rotational speed of the rotor 204. Additionally, or in the alternative, the seal body 302 may be located at a first position in relation to the seal housing 300 and/or the rotor 204 when operating the rotary machine 200 during a first mission stage. The seal body 302 may be located at a second position in relation to the seal housing 300 and/or the rotor 204 when operating the rotary machine 200 during a second mission stage. The first mission stage may include at least one of: idling, taxiing, cruising, decelerating, and/or low speed travel. The first mission stage may include operating the rotary machine 200 with the first operating condition. The second mission stage may include at least one of: takeoff, climbing, aggressive maneuvering, high-speed travel, rapid acceleration, and/or landing. The second mission stage may include operating the rotary machine 200 with the second operating condition.

In some embodiments, when operating the rotary machine 200 with the first operating condition, at least a portion of the pressurized fluid within the fluid-bearing gap 322 may be provided by the secondary leakage path 360. In some embodiments, when operating the rotary machine 200 with the first operating condition, a pressure drop across the secondary leakage path 360 may be less than a pressure drop across the primary leakage path 324, for example, such that a fluid flow along the secondary leakage path 360 exceeds a fluid flow along the primary leakage path 324. In some embodiments, when operating the rotary machine 200 with the first operating condition, substantially all of the pressurized fluid within the fluid-bearing gap 322 may be provided by the secondary leakage path 360. Additionally, or in the alternative, when operating the rotary machine 200 with the second operating condition, at least a portion of the pressurized fluid within the fluid-bearing gap 322 may be provided by the primary leakage path 324. In some embodiments, when operating the rotary machine 200 with the second operating condition, a pressure drop across the primary leakage path 324 may be less than a pressure drop across the secondary leakage path 360, for example, such that a fluid flow along the primary leakage path 324 exceeds a fluid flow along the secondary leakage path 360. In some embodiments, when operating the rotary machine 200 with the second operating condition, substantially all of the pressurized fluid within the fluid-bearing gap 322 may be provided by the primary leakage path 324. Additionally, or in the alternative, the pressurized fluid within the fluid-bearing gap 322 may be provided at least in part by the primary leakage path 324 and at least in part by the secondary leakage path when operating the rotary machine 200 with the second operating condition. In some embodiments, a pressure and/or a pressure differential with respect to the inlet plenum 206 and/or the outlet plenum 208 corresponding to the first operating condition may be less than the pressure and/or pressure differential corresponding to the second operating condition. Additionally, or in the alternative, in some embodiments, a rotational speed of the rotor 204 corresponding to the first operating condition may be less than a rotational speed of the rotor 204 corresponding to the second operating condition. Additionally, or in the alternative, in some embodiments, a radial width of the fluid-bearing gap 322 corresponding to the first operating condition may be greater than a radial width of the fluid-bearing gap 322 corresponding to the second operating condition.

In some embodiments, the rotary machine 200 may be operated with a third operating condition. The third operation condition may respectively correspond to a mission stage that includes at least one of: takeoff, climbing, aggressive maneuvering, high-speed travel, rapid acceleration, and/or landing. In some embodiments, when operating the rotary machine 200 with the third operating condition, at least a portion of the pressurized fluid within the fluid-bearing gap 322 may be provided by the primary leakage path 324 and at least a portion of the pressurized fluid within the fluid-bearing gap 322 may be provided by the secondary leakage path 360. In some embodiments, when operating the rotary machine 200 with the second operating condition, a pressure drop across the primary leakage path 324 may be less than a pressure drop across the secondary leakage path 360, for example, such that a fluid flow along the primary leakage path 324 exceeds a fluid flow along the secondary leakage path 360. Additionally, or in the alternative, in some embodiments, when operating the rotary machine 200 with the third operating condition, a pressure drop across the secondary leakage path 360 may be less than a pressure drop across the primary leakage path 324, for example, such that a fluid flow along the secondary leakage path 360 exceeds a fluid flow along the primary leakage path 324. Additionally, or in the alternative, in some embodiments, when operating the rotary machine 200 with the third operating condition, substantially all of the pressurized fluid within the fluid-bearing gap 322 may be provided by the secondary leakage path 360. In some embodiments, a pressure difference between the inlet plenum 206 and the outlet plenum 208 corresponding to the third operating condition may be less than such a pressure difference corresponding to the second operating condition. Additionally, or in the alternative, a rotational speed of the rotor 204 corresponding to the third operating condition may be greater than the rotational speed of the rotor 204 corresponding to the second operating condition. Additionally, or in the alternative, in some embodiments, a radial width of the fluid-bearing gap 322 corresponding to the third operating condition may be greater than a radial width of the fluid-bearing gap 322 corresponding to the second operating condition.

In some embodiments, the seal assembly 202 may include one or more piston rings 372. The one or more piston rings 372 may be respectively disposed about an interface between the seal housing 300 and the seal body 302. A piston ring 372 may be seated in a corresponding recess or groove in the seal housing 300 or the seal body 302. The one or more piston rings 372 may be configured to inhibit fluid leakage past a respective interface between the seal housing 300 and the seal body 302. As shown in FIG. 3A, the seal assembly 202 may include a piston ring 372 disposed about an interface between the seal body 302 and the laterally-distal sidewall 306 of the seal housing 300, such as between the laterally-distal sidewall 306 and the piston head 316. Additionally, or in the alternative, the seal assembly 202 may include a piston ring 372 disposed about an interface between the seal body 302 and the laterally-proximal sidewall 308 of the seal housing 300, such as between the laterally-proximal sidewall 308 and the piston head 316. Additionally, or in the alternative, the seal assembly 202 may include a piston ring 372 disposed about an interface between the seal body 302 and the radially-proximal wall 312 of the seal housing 300, such as at opposite sides of the flange 318 of the seal body 302. Additionally, or in the alternative, the seal assembly 202 may include a piston ring 372 disposed about an interface between the seal body 302 and the ancillary forward wall 338 of the seal housing 300, such as between the ancillary forward wall 338 and the laterally-distal seal wall 350 of the seal body 302. Such locations of the seal housing 300 and/or such locations of the seal body 302 may include a recess, groove, or the like configured to receive the corresponding piston ring.

Still referring to FIGS. 3A and 3B, and with further reference to FIG. 2A, in some embodiments, when a seal assembly 202 includes a plurality of seal segments 216, circumferentially adjacent seal segments 216 may be coupled to one another at a corresponding segment interface 218. As shown in FIGS. 3A and 3B, a respective segment interface 218 may include one or more joining elements 374 disposed about the respective seal housing 300 of circumferentially adjacent seal segments 216. One or more joining elements 374 disposed about a first seal housing 300 of a first seal segment 216 may mate with a corresponding one or more joining elements 374 disposed about a second seal housing 300 of a second seal segment 216 located circumferentially adjacent to the first seal segment 216. Additionally, or in the alternative, a respective segment interface 218 may include one or more joining elements 374 disposed about the respective seal body 302 of circumferentially adjacent seal segments 216. One or more joining elements 374 disposed about a first seal body 302 of a first seal segment 216 may mate with a corresponding one or more joining elements 374 disposed about a second seal body 302 of a second seal segment 216 located circumferentially adjacent to the first seal segment 216.

As shown in FIG. 3A, the one or more joining elements 374 may be configured as lap joints. It will be appreciated that other joining elements are also contemplated in addition, or in the alternative to lap joints. By way of example, a joining element 374 may include a press-fitting joint, a snap-fit joint, a dovetail joint, a tongue-and-groove joint, or the like, as well as combinations of these. In some embodiments, one or more joining elements 374 disposed about the seal housing 300 of respective seal segments 216 may inhibit movement of the respective seal housing 300, and/or to inhibit fluid leakage at the segment interface 218, such as between circumferentially adjacent seal housings 300. Additionally, or in the alternative, one or more joining elements 374 disposed about the seal body 302 of respective seal segments 216 may allow movement of the seal body 302 along the radial axis, while inhibit movement of the seal body 302 along the axis of rotation 210 of the rotor 204. Additionally, or in the alternative, the one or more joining elements 374 disposed about the seal body 302 of respective seal segments 216 may inhibit fluid leakage at the segment interface 218, such as between circumferentially adjacent seal bodies 302.

In some embodiments, as shown in FIGS. 3A and 3B, the seal housing 300 may include one or more piston stops 376 that extend into the seal chamber 304, such as into a distal region 370 of the seal chamber 304. The one or more piston stops 376 may provide a limit to a range of motion of the seal body 302. For example, the one or more piston stops 376 may prevent the piston head 316 and/or another portion of the seal body 302 from blocking one or more fluid supply apertures 326.

Alternatively, in some embodiments, the one or more piston stops 376 may be omitted, for example, to allow the piston head 316 and/or another portion of the seal body 302 to block one or more fluid supply apertures 326 at a corresponding position of the seal body 302 relative to the seal housing 300. For example, in some embodiments, the piston head 316 and/or another portion of the seal body 302 may block one or more fluid supply apertures 326 during operation of a turbine engine 100 in an idle or cruise operating state. Additionally, or in the alternative, the one or more fluid supply apertures 326 may be open or unblocked by the piston head 316 and/or another portion of the seal body 302 during operation of a turbine engine 100 in high-power operating state.

Figure 4A:
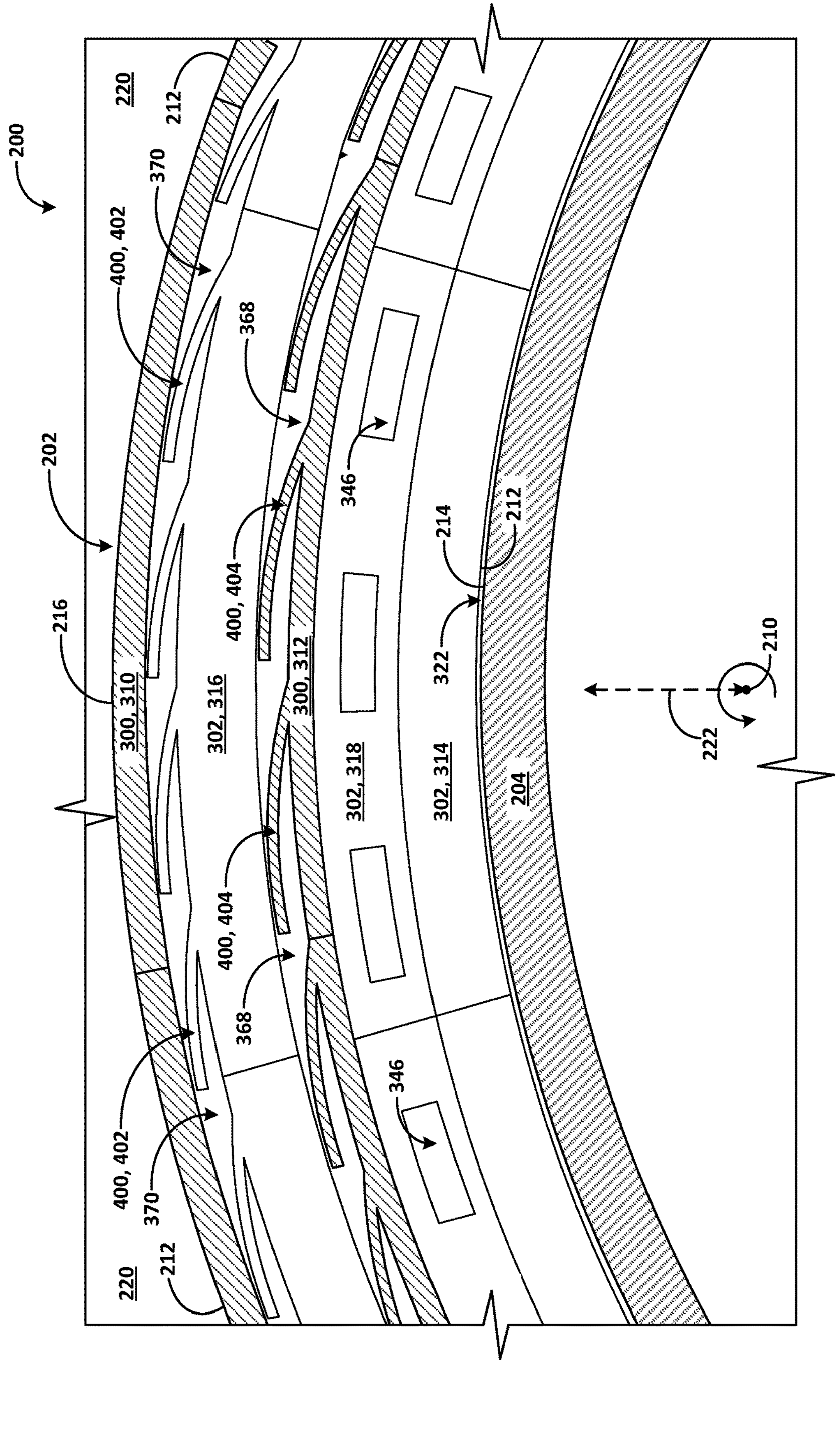
FIGS. 4A and 4B respectively show a schematic cutaway axial cross-sectional view of an exemplary seal assembly.
Figure 4B:
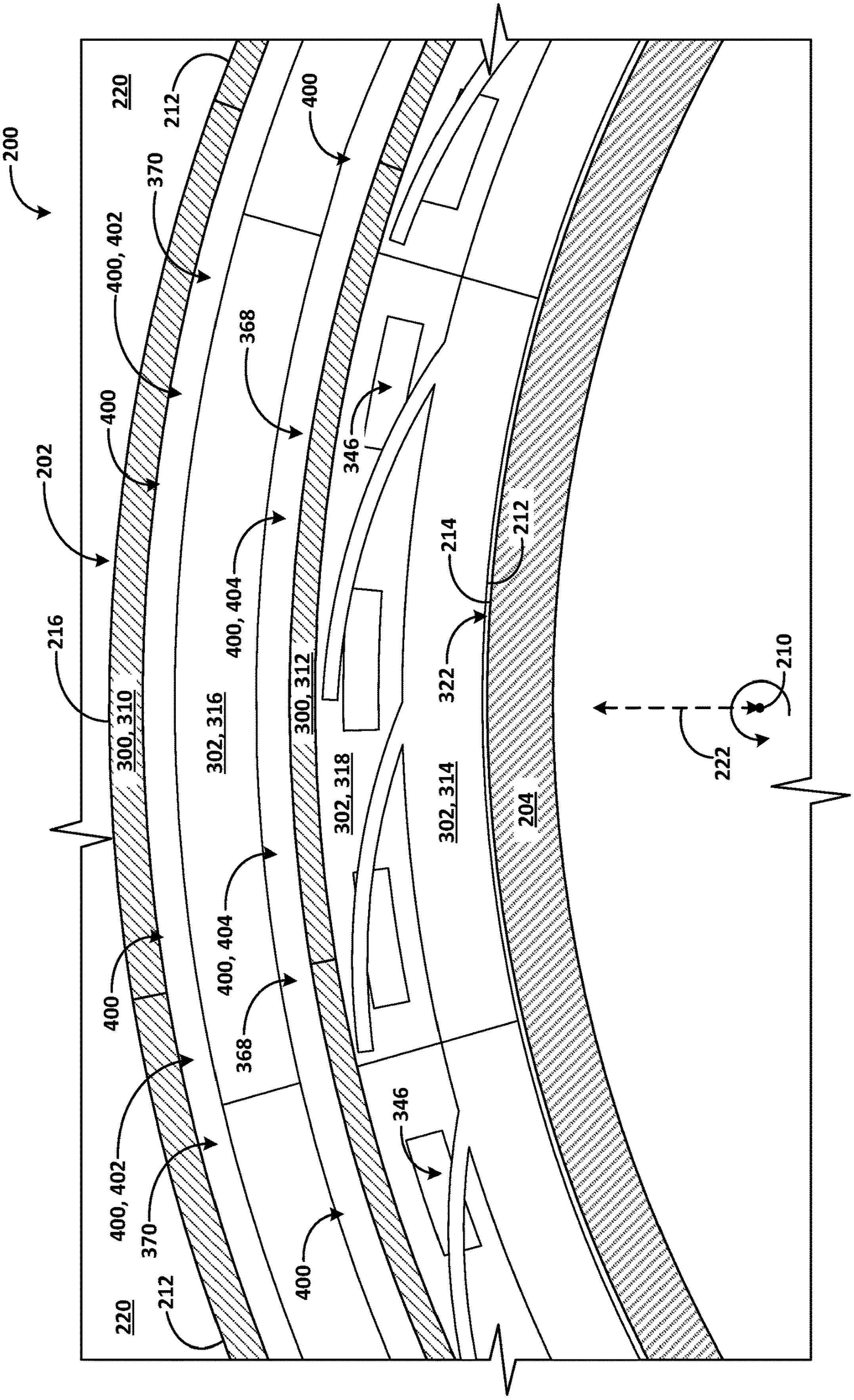

Now turning to FIGS. 4A and 4B, exemplary seal assemblies 202 are further described. As shown, a seal assembly 202 may include a plurality of positioning arms 400. Respective seal segments 216 may include at least one positioning arm 400. The one or more positioning arms 400 may position the seal body 302 at a suitable position with respect to the radial axis 222, for example, to provide a suitable fluid-bearing gap 322. As shown in FIG. 4A, one or more positioning arms 400 may be monolithically integrated with a corresponding seal housing 300. Additionally, or in the alternative, as also shown, one or more positioning arms 400 may be monolithically integrated with a corresponding seal body 302. Additionally, or in the alternative, one or more positioning arms 400 may be coupled to a corresponding seal housing 300 and/or to a corresponding seal body 302. Additionally, or in the alternative, one or more positioning arms 400 may be situated in a floating relationship with respect to a corresponding seal housing 300 and/or with respect to a corresponding seal body 302.

In some embodiments, the one or more positioning arms 400 may include one or more radially-distal positioning arms 402 disposed within a distal region 370 of the seal chamber 304, such as between a radially-distal wall 310 of the seal housing 300 and a portion of the seal body 302 disposed within the seal chamber 304, such as the piston head 316. As shown in FIG. 4A, one or more radially-distal positioning arms 402 may be monolithically integrated with, or coupled to, the seal body 302, such as the piston head 316. Also as shown, the one or more radially-distal positioning arms 402 may be situated in a floating relationship with respect to the seal housing 300, such as with respect to the radially-distal wall 310 of the seal housing 300. Additionally, or in the alternative, a seal assembly 202 may include one or more radially-distal positioning arms 402 monolithically integrated with, or coupled to, a seal housing 300, such as a radially-distal wall 310 of the seal housing 300, and/or the seal assembly 202 may include one or more radially-distal positioning arms 402 situated in a floating relationship with respect the seal body 302, such as the piston head 316.

In some embodiments, the one or more positioning arms 400 may include one or more radially-proximal positioning arms 404 disposed within a proximal region 368 of the seal chamber 304, such as between a radially-proximal wall 312 of the seal housing 300 and a portion of the seal body 302 disposed within the seal chamber 304, such as the piston head 316. As shown in FIG. 4A, one or more radially-proximal positioning arms 404 may be monolithically integrated with, or coupled to, the seal housing 300, such as a radially-proximal wall 312 of the seal housing 300. Also as shown, the one or more radially-proximal positioning arms 404 may be situated in a floating relationship with respect to the seal body 302, such as the piston head. Additionally, or in the alternative, a seal assembly 202 may include one or more radially-proximal positioning arms 404 monolithically integrated with, or coupled to, a seal body 302, such as the piston head 316, and/or the seal assembly 202 may include one or more radially-proximal positioning arms 404 situated in a floating relationship with respect the seal housing 300, such as a radially-proximal wall 312 of the seal housing 300.

In some embodiments, as shown, for example, in FIG. 4B, the one or more positioning arms 400 may include one or more radially-proximal positioning arms 404 disposed in a proximal position with respect to the radial axis 222 in relation to the seal housing 300. For example, one or more radially-proximal positioning arms 404 may be disposed between the seal housing 300 and the rotor shoe 314 of the seal housing 300, such as between a radially-proximal wall 312 of the seal housing 300 and the rotor shoe 314. As shown in FIG. 4B, one or more radially-proximal positioning arms 404 may be monolithically integrated with, or coupled to, the seal body 302, such as the rotor shoe 314. Also as shown, the one or more radially-proximal positioning arms 404 may be situated in a floating relationship with respect to the seal housing 300, such as with respect to the radially-proximal wall 312 of the seal housing 300. Additionally, or in the alternative, a seal assembly 202 may include one or more radially-proximal positioning arms 404 monolithically integrated with, or coupled to, a seal housing 300, such as a radially-proximal wall 312 of the seal housing 300, and/or the seal assembly 202 may include one or more radially-proximal positioning arms 404 situated in a floating relationship with respect the seal body 302, such as the rotor shoe 314.

In some embodiments, the one or more positioning arms 400 may dampen movement of seal body 302 along the radial axis 222 in relation to the seal housing 300, such as in response to changes in pressure and/or pressure difference between pressure or pressure difference with respect to the inlet plenum 206 and the outlet plenum 208. For example, at least a portion of a range of movement of the seal body 302 along the radial axis 222 in relation to the seal housing 300 may be at least partially inhibited by the one or more positioning arms 400. The one or more positioning arms 400 may have an elasticity selected to provide suitable damping. In some embodiments, the seal body 302 may float freely along the radial axis in relation to the seal housing 300 with respect to at least a portion of a range of motion of the seal body 302. The one or more positioning arms 400 may dampen all or a portion of the range of motion of the seal body 302. In some embodiments the one or more positioning arms 400 may be configured as a leaf spring, a cockle spring, a compression spring, a disc spring, a garter spring, a finger spring, a wave spring, a linear wave spring, or the like.

In some embodiments, a position of the one or more positioning arms 400 may depend at least in part on a temperature of the one or more positioning arms 400. The temperature of the one or more positioning arms 400 may depend at least in part on one or more operating conditions of the rotary machine 200, such as a temperature of the fluid flowing along the primary leakage path 324 and/or the secondary leakage path 360. In some embodiments, the one or more positioning arms 400 may be configured such that thermal expansion of the one or more positioning arms 400 provides for a position of the rotor shoe 314 and/or a corresponding radial width of the fluid-bearing gap 322 that coincides with one or more operating conditions of the rotary machine 200. Additionally, or in the alternative, in some embodiments, the one or more positioning arms 400 may be formed of a shape-memory alloy. Exemplary shape-memory alloys include copper-aluminum-nickel alloys, nickel-titanium alloys, iron-manganese-silicon alloys, copper-zinc-aluminum alloys, and copper-aluminum-nickel alloys, or the like, as well as combinations of these.

Figure 5B:
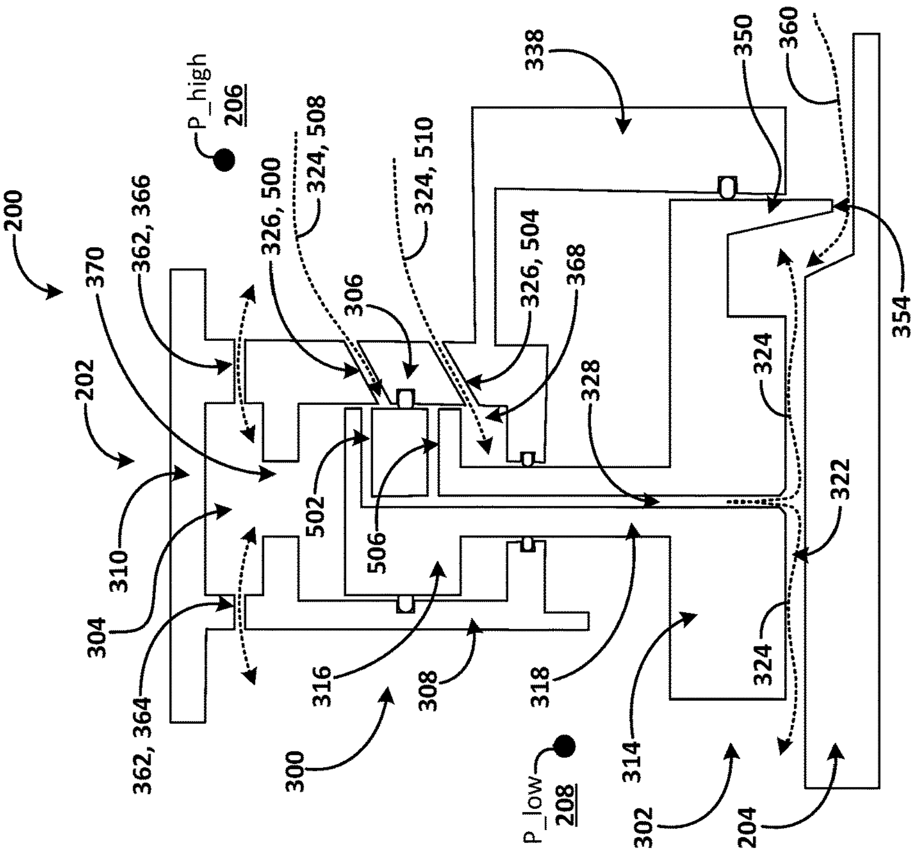
FIGS. 5A and 5B respectively show schematic cross-sectional views of further exemplary seal assemblies.
Figure 5A:
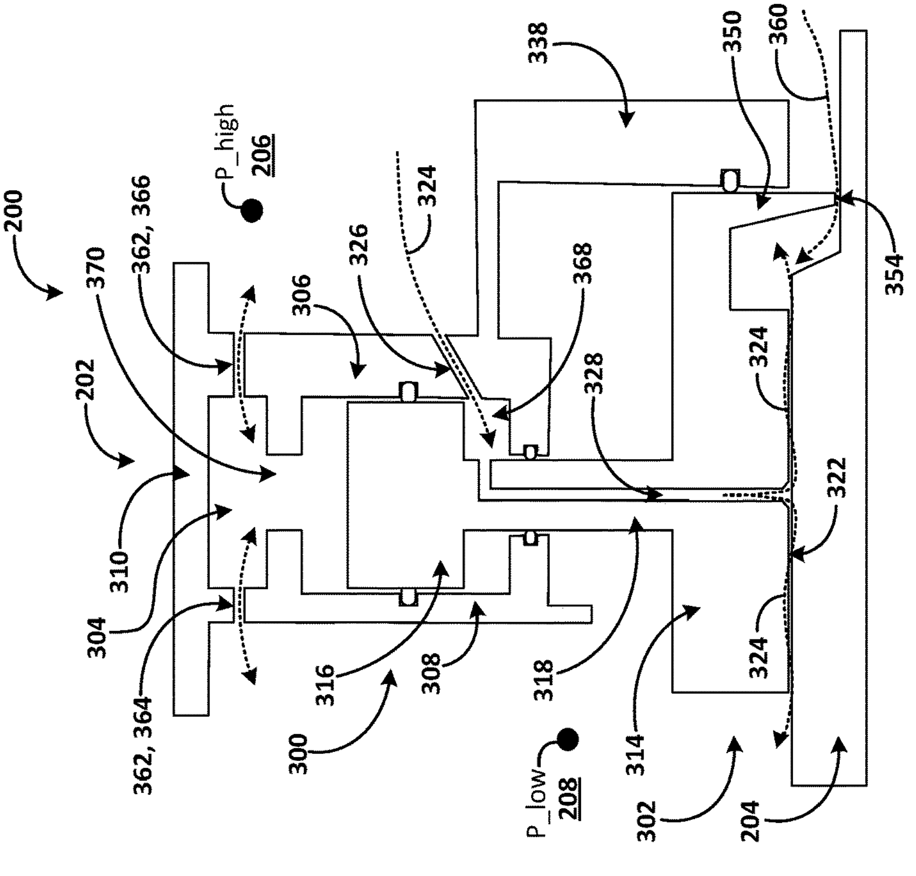

Referring now to FIGS. 5A and 5B, exemplary seal assemblies 202 are further described. As shown in FIGS. 5A and 5B, in some embodiments, a seal assembly 202 may include a seal housing 300 that has one or more fluid supply apertures 326 that fluidly communicate with the seal chamber 304, such as with a proximal region 368 of the seal chamber 304. Additionally, or in the alternative, the seal assembly 202 may include a seal body 302 that has one or more fluid conduits 328 that fluidly communicate with the proximal region 368 of the seal chamber 304. In some embodiments, the primary leakage path 324 may include the proximal region 368 of the seal chamber 304.

In some embodiments, the seal housing 300 may include one or more seal body-positioning vents 362, such as one or more inlet plenum-positioning vents 366 that provide fluid communication between the inlet plenum 206 and the seal chamber 304. The one or more inlet plenum-positioning vents 366 may be provided in addition to the one or more fluid supply apertures 326. In some embodiments, as shown in FIGS. 5A and 5B, the one or more inlet plenum-positioning vents 366 may fluidly communicate with the distal region 370 of the seal chamber 304.

Additionally, or in the alternative, the seal housing 300 may include one or more outlet plenum-positioning vents 364 that provide fluid communication between the seal chamber 304 and the outlet plenum 208. In some embodiments, as shown in FIGS. 5A and 5B, the one or more outlet plenum-positioning vents 364 may fluidly communicate with the distal region 370 of the seal chamber 304.

In some embodiments, as shown, for example, in FIG. 5B, a seal assembly 202 may include a seal housing 300 that has a plurality of fluid supply apertures 326. The seal assembly 202 may include a seal body 302 that has one or more fluid conduits 328 that fluidly communicate with a respective one of the plurality of fluid supply apertures 326 depending at least in part on a position of the seal body 302 along the radial axis 222 in relation to the seal housing 300. Additionally, or in the alternative, the seal body 302 may include a plurality of fluid conduits that fluidly communicate with one or more fluid supply apertures 326 depending at least in part on a position of the seal body 302 along the radial axis 222 in relation to the seal housing 300.

For example, as shown in FIG. 5B, a first fluid supply aperture 500 may fluidly communicate with a first fluid conduit 502 when the seal body 302 is located at a first position along the radial axis 222 in relation to the seal housing 300. A second fluid supply aperture 504 may fluidly communicate with a second fluid conduit 506 when the seal body 302 is located at a second position along the radial axis 222 in relation to the seal housing 300. In some embodiments, the second fluid supply aperture 504 may be obstructed, for example, by a portion of the seal body 302, such as by a portion of the piston head 316, when the seal body 302 is located at the first position such that the first fluid supply aperture 500 fluidly communicates with the first fluid conduit 502. Additionally, or in the alternative, the second fluid supply aperture 504 may fluidly communicate with the proximal region 368 of the seal chamber 304 when the seal body 302 is located at the first position. Additionally, or in the alternative, in some embodiments, the first fluid supply aperture 500 may be obstructed, for example, by a portion of the seal body 302, such as by a portion of the piston head 316, when the seal body 302 is located at the second position such that the second fluid supply aperture 504 fluidly communicates with the second fluid conduit 506. Additionally, or in the alternative, the first fluid supply aperture 500 may fluidly communicate with the distal region 370 of the seal chamber 304 when the seal body 302 is located at the second position. In some embodiments, the first fluid supply aperture 500 may fluidly communicate with the first fluid conduit 502 and the second fluid conduit 506 depending on the location of the seal body 302 along the radial axis 222 in relation to the seal housing 300. Additionally, or in the alternative, the second fluid supply aperture 504 may fluidly communicate with the first fluid conduit 502 and the second fluid conduit 506 depending on the location of the seal body 302 along the radial axis 222 in relation to the seal housing 300.

Respective ones of a plurality of fluid supply apertures 326 and/or respective ones of a plurality of fluid conduits 328 may provide a specified pressure drop that differs as between the plurality, thereby providing a plurality of different primary leakage paths 324 that respectively provide a different rate of fluid flow to the fluid-bearing gap 322. Respective ones of the plurality of primary leakage paths 324 may correspond to one or more operating conditions of the rotary machine 200. For example, the seal assembly 202 may provide fluid to the fluid-bearing gap 322 by way of a first primary leakage path 508 when the rotary machine operates according to a first operating condition. Additionally, or in the alternative, the seal assembly 202 may provide fluid to the fluid-bearing gap 322 by way of a second primary leakage path 510 when the rotary machine operates according to a second operating condition. The operation condition of the rotary machine 200 may include and/or correspond to a pressure and/or pressure difference with respect to the inlet plenum 206 and the outlet plenum 208, and/or a rotational speed of the rotor 204.
Additionally, or in the alternative, the operating condition of the rotary machine may correspond to a mission stage of the rotary machine 200 as described herein.

Figure 6A:
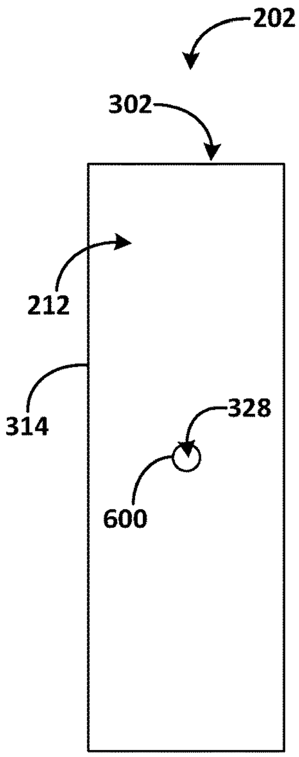
FIGS. 6A-6E respectively show a schematic facing view of an exemplary seal face of a seal assembly.
Figure 6B:
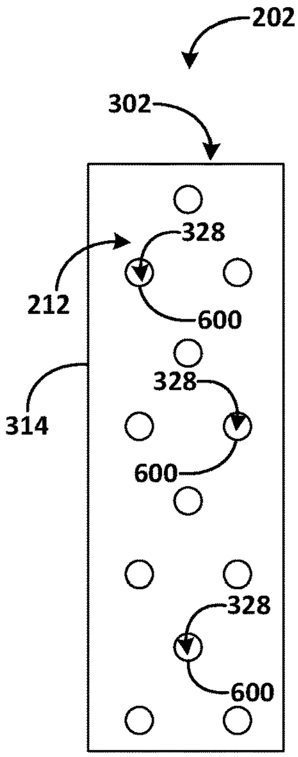
Figure 6C:
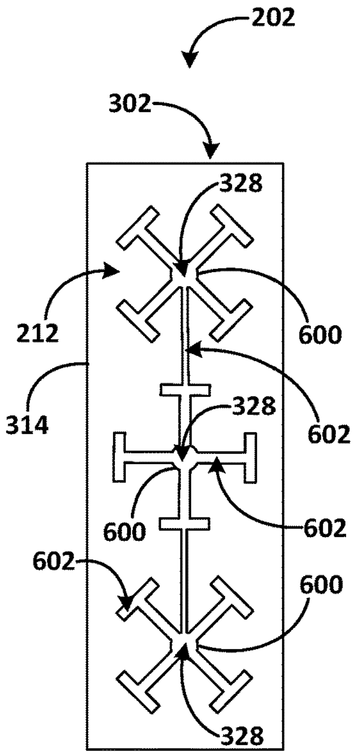
Figure 6D:
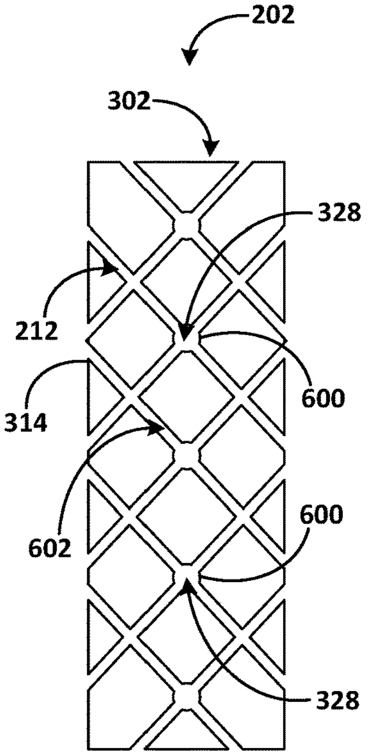
Figure 6E:
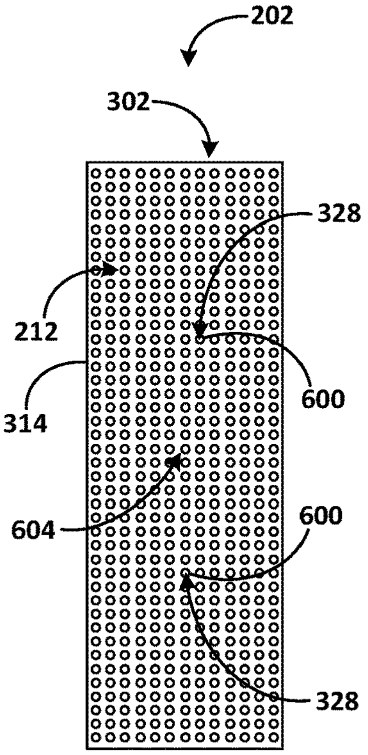

Now turning to FIGS. 6A-6E, exemplary seal bodies 302 are further described. As shown, a seal body 302 and/or a rotor shoe 314 may include a seal face 212 that has one or more orifices 600. The one or more orifices 600 may define a radially-proximal opening 330 of a fluid conduit 328 and/or may otherwise fluidly communicate with one or more fluid conduits 328 (FIGS. 3A and 3B, 5A and 5B). By way of example, as shown in FIG. 6A, a seal body 302 and/or a rotor shoe 314 may include a seal face 212 that has a single orifice 600 that fluidly communicates with a fluid conduit 328. As another example, as shown in FIG. 6B, a seal body 302 and/or a rotor shoe 314 may include a seal face 212 that has a plurality of orifices 600. The plurality of orifices 600 may fluidly communicate with one or more fluid conduits 328. In some embodiments, as shown, for example, in FIGS. 6C and 6D, a seal body 302 may include a seal face 212 that has a plurality of channels 602 configured to distribute fluid from one or more orifices 600 across the seal face 212. As shown in FIG. 6C, the seal face 212 may include a plurality of channels 602 that have a terminal end within the rotor shoe 314 and/or the seal face 212. Additionally, or in the alternative, as shown in FIG. 6D, the rotor shoe 314 and/or the seal face 212 may include a plurality of channels 602 that fluidly communicate with a perimeter of the seal face 212. In some embodiments, the rotor shoe 314 and/or the seal face 212 may include a porous medium 604. The porous medium 604 may define a multitude of orifices 600 that fluidly communicate with one or more fluid conduits 328. The configuration and arrangement of the one or more orifices 600, the plurality of channels 602, and/or the porous medium 604 may be selected at least in part to provide a desired radial width of a fluid-bearing gap 322 and/or a desired rate of fluid flow through the fluid-bearing gap 322 (FIGS. 3A and 3B, 5A and 5B). Additionally, or in the alternative, the configuration and arrangement of the one or more orifices 600 may be selected at least in part to provide a desired pressure distribution across the seal face 212.

Figure 7:
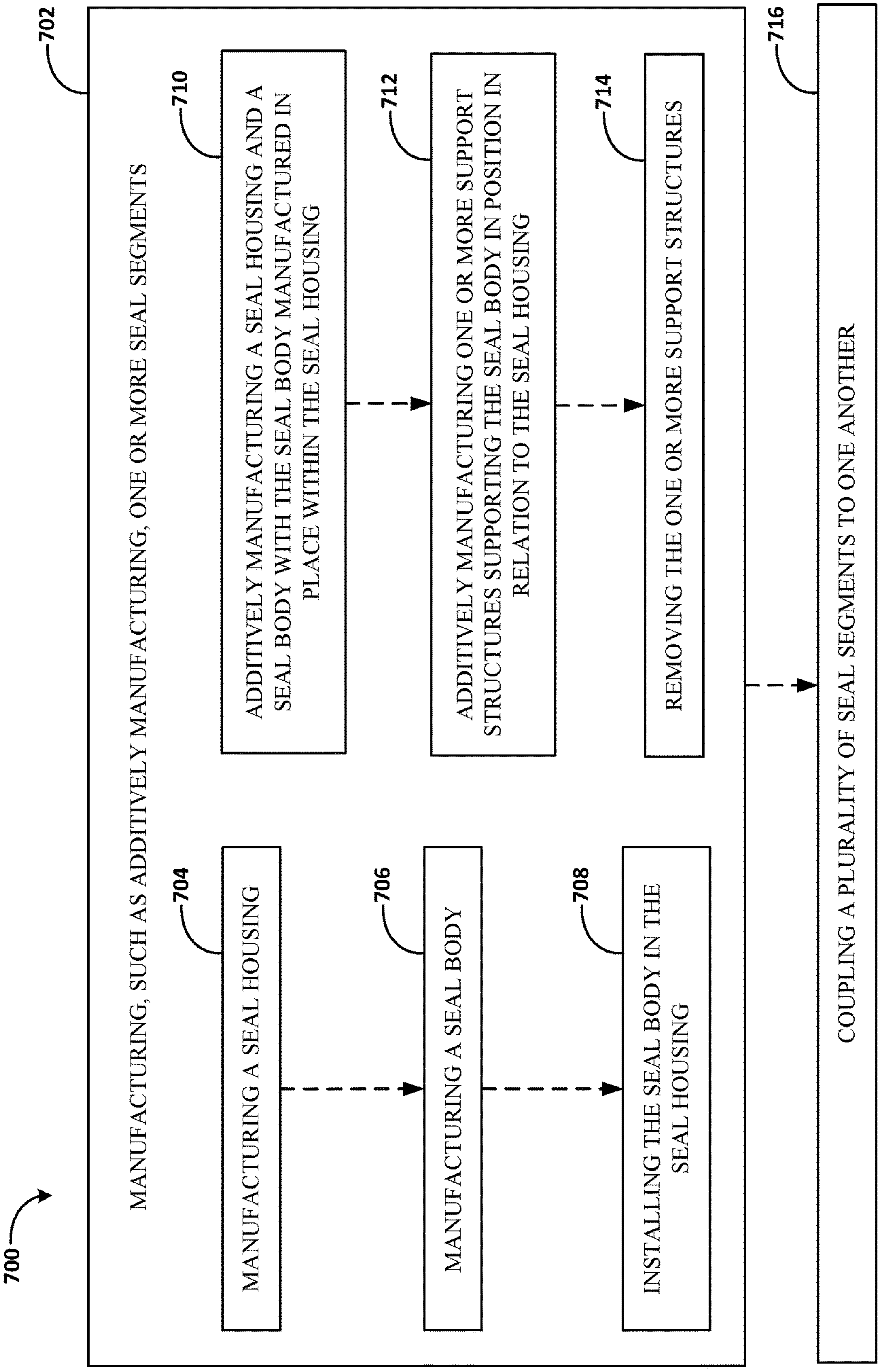
FIG. 7 shows a flow chart depicting an exemplary method of manufacturing a seal assembly.

Now referring to FIG. 7, exemplary methods of manufacturing a seal assembly 202 are described. In some embodiments, one or more portions of a seal assembly 202 may be manufactured using an additive manufacturing technology. Additionally, or in the alternative, one or more portions of a seal assembly 202 may be additively manufactured using other technologies, such as casting, forging, machining, extrusion, and so forth. As shown in FIG. 7, an exemplary method 700 of manufacturing a seal assembly 202 may include, at block 702, manufacturing one or more seal segments 216. The one or more seal segments 216 may include a seal housing 300 and a seal body 302. For example, a seal segment 216 may include a seal housing 300 and a plurality of seal bodies 302. Additionally, or in the alternative, the seal segment 216 may include one seal housing and one seal body 302. A respective seal housing 300 may have an annular configuration or a semiannular configuration. A respective seal body 302 may have a semiannular configuration. The manufacturing of the one or more seal segments 216 may include, at block 704, manufacturing a seal housing 300. At block 706, the manufacturing of the one or more seal segments 216 may include manufacturing a seal body 302. At block 708, the manufacturing of the one or more seal segments 216 may include installing the seal body 302 in the seal housing 300. For example, a portion of the seal body 302, such as the piston head 316 and/or the flange 318 may be inserted into the seal chamber 304 of the seal housing 300 from a radial end of the seal housing 300. In some embodiments, the seal housing 300 and/or the seal body 302 may be additively manufactured. In some embodiments, the seal housing 300 and the seal body 302 may be additively manufactured concurrently, for example, with the seal body 302 manufactured in place within the seal housing 300.

Additionally, or in the alternative, as shown in FIG. 7, an exemplary method 700 of manufacturing a seal assembly 202 may include, at block 710, additively manufacturing a seal housing 300 and a seal body 302 with the seal body 302 manufactured in place within the seal housing 300. For example, the seal housing 300 and the seal body 302 may be additively manufactured with the seal chamber 304 of the seal housing 300 having at least a portion of the seal body 302 located therein, such as with the piston head 316 and/or the flange 318 of the seal body 302 located within the seal chamber 304. In some embodiments, manufacturing the one or more seal segments 216 may include, at block 712, additively manufacturing one or more support structures supporting the seal body 302 in position in relation to the seal housing 300. The support structures may be located about an external portion of the seal segment and/or an internal portion of the seal segment. In some embodiments, manufacturing the one or more seal segments 216 may include, at block 714, removing the one or more support structures. The one or more support structures may be removed by any suitable methodology. For example, the support structures may be cut away using an electrical discharge machine (EDM) such as a wire-cut EDM or another suitable cutting tool. Additionally, or in the alternative, support structures may be removed using a chemical etching process. In some embodiments, one or more seal segments 216 may be additively manufactured with the seal body 302 manufactured in place within the seal housing 300, without requiring support structures.

In some embodiments, an exemplary method 700 of manufacturing a seal assembly 202 may include, at block 716, coupling a plurality of seal segments 216 to one another. By way of example, the plurality of seal segments 216 may be coupled to one another by way of a press-fit, welding, brazing, a retaining ring, bolts, or other suitable attachment hardware. In some embodiments, the one or more seal segments 216 may be coupled to one another by one or more joining elements 374 (FIGS. 3A and 3B) disposed about the respective seal housing 300 and/or disposed about the respective seal body 302.

Figure 8:
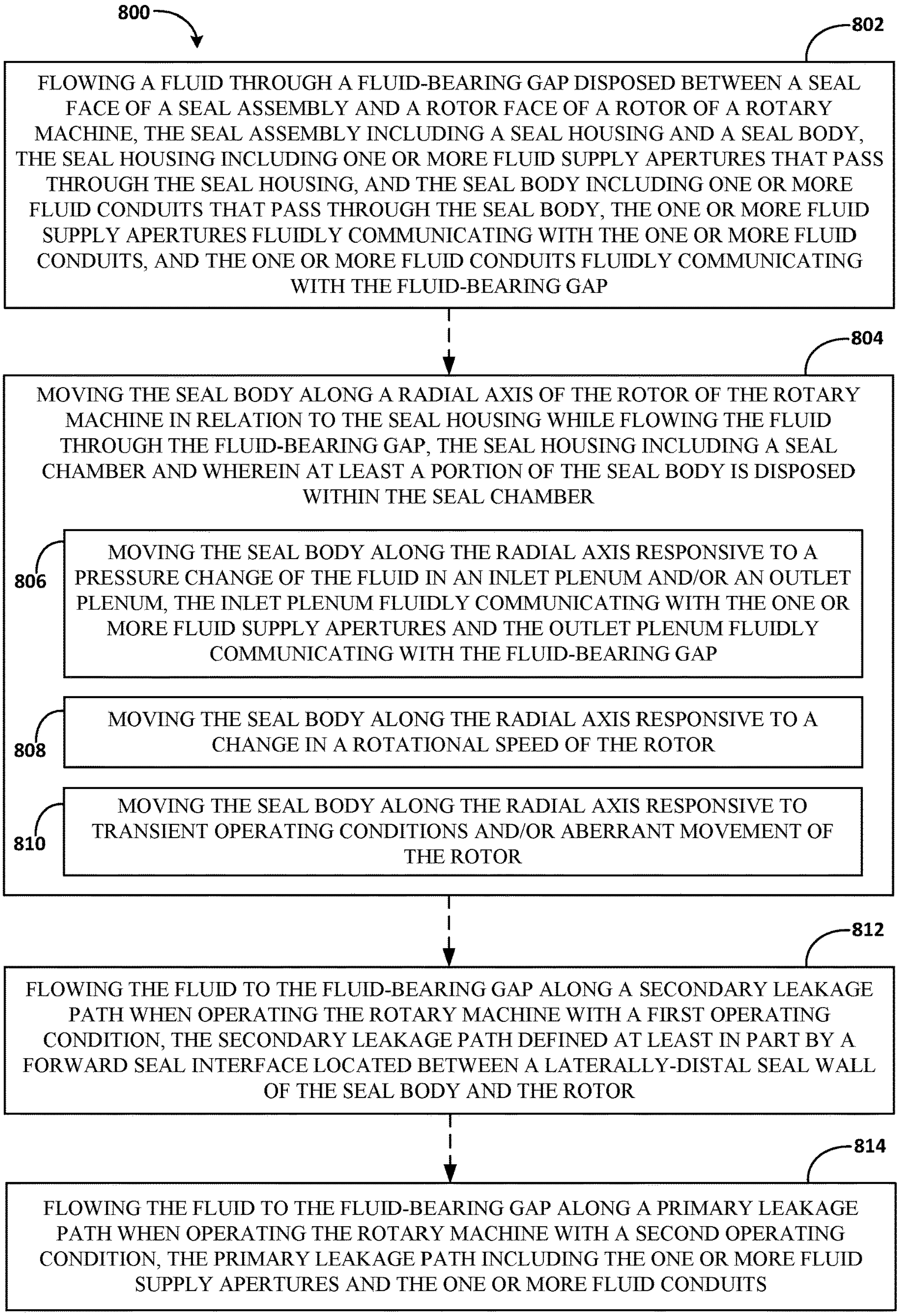
FIG. 8 shows a flow chart depicting a method of sealing an interface between a rotor and a stator.

Now referring to FIG. 8, exemplary methods of sealing a rotor 204 of a rotary machine 200 are described. As shown in FIG. 8, an exemplary method 800 may include, at block 802, flowing a fluid through a fluid-bearing gap 322 disposed between a seal face 212 of a seal assembly 202 and a rotor face 214 of the rotor 204 (FIGS. 3A and 3B). The seal assembly 202 may include a seal housing 300 and a seal body 302. The seal housing 300 may include one or more fluid supply apertures 326 that pass through the seal housing 300, and the seal body 302 may include one or more fluid conduits 328 that pass through the seal body 302. The fluid may flow to the fluid-bearing gap 322 from an inlet plenum 206 by way of the one or more fluid supply apertures 326 and the one or more fluid conduits 328. The one or more fluid supply apertures 326 may fluidly communicate with the inlet plenum 206 and the one or more fluid conduits 328 may fluidly communicate with the one or more fluid supply apertures 326, such as by way of the seal chamber 304. The one or more fluid conduits 328 may fluidly communicate with the fluid-bearing gap 322. The fluid may flow from the fluid-bearing gap 322 to an outlet plenum 208 fluidly communicating with the fluid-bearing gap 322.

At block 804, an exemplary method 800 may include moving the seal body 302 along a radial axis 222 of the rotary machine 200 in relation to the seal housing 300 while flowing the fluid through the fluid-bearing gap 322. The seal housing 300 may include a seal chamber 304 and at least a portion of the seal body 302 may be disposed within the seal chamber 304. For example, the seal body 302 may include a piston head 316 and/or a flange 318 disposed within the seal chamber 304. Moving the seal body 302 along the radial axis 222 may include moving at least a portion of the seal body within the seal chamber 304, such as the piston head 316 and/or the flange 318 of the seal body 302. Additionally, or in the alternative, moving the seal body 302 along the radial axis 222 may include moving at least a portion of the seal body 302, such as the flange 318, through a seal body channel 320 disposed about the seal housing 300, such as a radially-proximal wall 312 of the seal housing 300. In some embodiments, an exemplary method 800 may include, at block 806, moving the seal body 302 along the radial axis 222 responsive to a pressure change of the fluid in the inlet plenum 206 and/or the outlet plenum 208, such as responsive to a change in a pressure difference between the fluid in the inlet plenum 206 and the fluid in the outlet plenum 208. Additionally, or in the alternative, an exemplary method 800 may include, at block 808, moving the seal body 302 along the radial axis 222 responsive to a change in a rotational speed of the rotor 204. Additionally, or in the alternative, an exemplary method 800 may include, at block 810, moving the seal body 302 along the radial axis 222 responsive to transient operating conditions and/or aberrant movement of the rotor 204.

In some embodiments, an exemplary method 800 may include, at block 812, flowing the fluid to the fluid-bearing gap 322 along a secondary leakage path 360 when operating the rotary machine 200 with a first operating condition, and, at block 814, flowing the fluid to the fluid-bearing gap 322 along a primary leakage path 324 when operating the rotary machine 200 with a second operating condition. The secondary leakage path 360 may be defined at least in part by a forward seal interface 354 located between a laterally-distal seal wall 350 of the seal body 302 and the rotor 204. Additionally, or in the alternative, the secondary leakage path 360 may be defined at least in part by an expansion chamber 348 located between the laterally-distal seal wall 350 and a rotor shoe 314 of the seal body 302. The primary leakage path 324 may include the one or more fluid supply apertures 326 and the one or more fluid conduits 328. In some embodiments, the primary leakage path 324 may include the seal chamber 304.

Further aspects of the presently disclosed subject matter are provided by the following clauses:

A seal assembly for a rotary machine, such as a turbine engine, the seal assembly, comprising: one or more seal segments, the one or more seal segments respectively comprising: a seal housing defining a seal chamber and one or more fluid supply apertures that pass through the seal housing; and a seal body comprising a seal face and one or more fluid conduits that pass through the seal body to the seal face; wherein the seal chamber receives at least a portion of the seal body, and wherein the seal body is movable within the seal chamber along a radial axis of a rotor of the rotary machine when the seal assembly is installed in the rotary machine; and wherein the one or more fluid supply apertures fluidly communicate with the one or more fluid conduits, and wherein the one or more fluid conduits are configured to fluidly communicate with a fluid-bearing gap defined between the seal face and a rotor face of the rotor when the seal assembly is installed in the rotary machine.

The seal assembly of any clause herein, wherein the one or more fluid conduits fluidly communicate with the seal chamber and wherein the one or more fluid supply apertures fluidly communicate with the one or more fluid conduits by way of the seal chamber.

The seal assembly of any clause herein, wherein the seal body comprises a rotor shoe and a piston head, wherein the seal chamber is configured to receive at least a portion of the piston head and wherein the piston head is movable within the seal chamber.

The seal assembly of any clause herein, wherein the seal body comprises a flange extending between the rotor shoe and the piston head, and wherein the seal body comprises a seal body channel configured to receive the flange, and wherein the flange is movable within the seal body channel in relation to the radial axis of the rotor.

The seal assembly of any clause herein, wherein the rotor shoe comprises the seal face, and wherein the seal face comprises one or more orifices that define a radially-proximal opening of the one or more fluid conduits.

The seal assembly of any clause herein, wherein the seal housing defines an ancillary seal chamber, and wherein the ancillary seal chamber is configured to receive at least a portion of the rotor shoe.

The seal assembly of any clause herein, wherein the seal body comprises one or more vent conduits extending through the rotor shoe, the one or more vent conduits configured to provide fluid communication between the ancillary seal chamber and the fluid-bearing gap.

The seal assembly of any clause herein, wherein the seal body comprises one or more crossover conduits extending through the flange of the seal body, wherein the one or more crossover conduits fluidly communicate with the ancillary seal chamber.

The seal assembly of any clause herein, wherein the seal body defines an expansion chamber defined at least in part by the rotor shoe.

The seal assembly of any clause herein, wherein the seal body comprises a laterally-distal seal wall, and wherein the expansion chamber is defined at least in part by the laterally-distal seal wall.

The seal assembly of any clause herein, wherein the laterally-distal seal wall comprises one or more teeth configured to provide a forward seal interface with the rotor.

The seal assembly of any clause herein, wherein the one or more fluid conduits, the one or more fluid supply apertures, and the fluid-bearing gap define at least a portion of a primary leakage path, and wherein the forward seal interface and the fluid-bearing gap define at least a portion of a secondary leakage path; wherein the secondary leakage path is configured to provide a flow of fluid through the fluid-bearing gap when operating the rotary machine with a first operating condition, and wherein the primary leakage path is configured to provide a flow of fluid through the fluid-bearing gap when operating the rotary machine with a second operating condition that differs from the first operating condition.

The seal assembly of any clause herein, wherein the seal housing defines an ancillary seal chamber, and wherein the seal body comprises one or more vent conduits extending through the rotor shoe, the one or more vent conduits fluidly communicating between the expansion chamber and the ancillary seal chamber, and wherein the one or more vent conduits and the expansion chamber respectively define a further portion of the primary leakage path, the further portion of the primary leakage path located downstream from the fluid-bearing gap.

The seal assembly of any clause herein, wherein the seal body comprises a flange extending between the rotor shoe and the piston head, and one or more crossover conduits extending through the flange, wherein the one or more crossover conduits fluidly communicate with the ancillary seal chamber, and wherein the one or more crossover conduits define an additional portion of the primary leakage path, the additional portion of the primary leakage path located downstream from the ancillary seal chamber.

The seal assembly of any clause herein, wherein the seal housing comprises one or more seal body-positioning vents, the one or more seal body-positioning vents configured to supply fluid to and/or from the seal chamber and thereby cause the seal body to move along the radial axis in relation to the seal housing as a result of fluid in the seal chamber exerting a force on the seal body.

The seal assembly of any clause herein, wherein the seal housing has a monolithic structure, and/or wherein the seal body has a monolithic structure.

The seal assembly of any clause herein, wherein the one or more seal segments comprises a plurality of seal segments, wherein the plurality of seal segments respectively have a semiannular configuration; and wherein respective ones of the plurality of seal segments comprise one or more joining elements configured to mate with a circumferentially adjacent one of the plurality of seal segments.

The seal assembly of any clause herein, wherein the one or more seal segments comprises one seal segment that has an annular configuration, wherein the seal housing has an annular configuration, and wherein the one seal segment comprises a plurality of seal bodies that have a semiannular configuration.

The seal assembly of any clause herein, comprising a plurality of positioning arms configured to position the seal body at a suitable position with respect to the radial axis of the rotor.

A rotary machine, such as a turbine engine, the rotary machine comprising: a rotor; a stator; and a seal assembly disposed between the rotor and the stator, the seal assembly comprising one or more seal segments, the one or more seal segments respectively comprising: a seal housing defining a seal chamber and one or more fluid supply apertures that pass through the seal housing; and a seal body comprising a seal face and one or more fluid conduits extending through the seal body to the seal face; wherein the seal chamber receives at least a portion of the seal body, and wherein the seal body is movable within the seal chamber along a radial axis of the rotor of the rotary machine; and wherein the one or more fluid supply apertures fluidly communicate with the one or more fluid conduits, and wherein the one or more fluid conduits are configured to fluidly communicate with a fluid-bearing gap defined between the seal face and a rotor face of the rotor.

The rotary machine of any clause herein, wherein the seal assembly is configured according to any clause herein.

A method of sealing an interface between a rotor and a stator of a rotary machine, such as a turbine engine, the method comprising: flowing a fluid through a fluid-bearing gap disposed between a seal face of a seal assembly and a rotor face of the rotor of the rotary machine, the seal assembly comprising a seal housing and a seal body, the seal housing comprising one or more fluid supply apertures that pass through the seal housing, and the seal body comprising one or more fluid conduits that pass through the seal body, the one or more fluid supply apertures fluidly communicating with the one or more fluid conduits, and the one or more fluid conduits fluidly communicating with the fluid-bearing gap; and moving the seal body along a radial axis of the rotor of the rotary machine in relation to the seal housing while flowing the fluid through the fluid-bearing gap, wherein the seal housing defines a seal chamber and wherein at least a portion of the seal body is disposed within the seal chamber.

The method of any clause herein, wherein the method is configured to be performed using the seal assembly of any clause herein.

A method of manufacturing a seal assembly, the method comprising: manufacturing one or more seal segments, wherein manufacturing one or more seal segments comprises manufacturing a seal housing and manufacturing a seal body.

The method of any clause herein, wherein manufacturing one or more seal segments comprises installing the seal body in the seal housing.

The method of any clause herein, wherein manufacturing one or more seal segments comprises additively manufacturing the seal housing and the seal body with the seal body manufactured in place within the seal housing.

The method of any clause herein, wherein manufacturing one or more seal segments comprises additively manufacturing one or more support structures supporting the seal body in position in relation to the seal housing, and removing the one or more support structures.

The method of any clause herein, comprising coupling a plurality of seal segments to one another.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A seal assembly for a turbine engine, the seal assembly, comprising:

one or more seal segments, the one or more seal segments respectively comprising:

a seal housing defining a seal chamber and one or more fluid supply apertures that pass through the seal housing; and a seal body comprising a seal face and one or more fluid conduits that pass through the seal body to the seal face;

wherein the seal chamber receives at least a portion of the seal body, and wherein the seal body is movable within the seal chamber along a radial axis of a rotor of the turbine engine when the seal assembly is installed in the turbine engine; and wherein the one or more fluid supply apertures fluidly communicate with the one or more fluid conduits, and wherein the one or more fluid conduits are configured to fluidly communicate with a fluid-bearing gap defined between the seal face and a rotor face of the rotor when the seal assembly is installed in the turbine engine.

2. The seal assembly of claim 1, wherein the one or more fluid conduits fluidly communicate with the seal chamber and wherein the one or more fluid supply apertures fluidly communicate with the one or more fluid conduits by way of the seal chamber.

3. The seal assembly of claim 1, wherein the seal body comprises a rotor shoe and a piston head, wherein the seal chamber is configured to receive at least a portion of the piston head and wherein the piston head is movable within the seal chamber.

4. The seal assembly of claim 3, further comprising a flange extending between the rotor shoe and the piston head, wherein the seal housing comprises a seal body channel configured to receive the flange, and wherein the flange is movable within the seal body channel in relation to the radial axis of the rotor.

5. The seal assembly of claim 4, wherein the rotor shoe comprises the seal face, and wherein the seal face comprises one or more orifices that define a radially-proximal opening of the one or more fluid conduits.

6. The seal assembly of claim 5, wherein the seal housing defines an ancillary seal chamber, and wherein the ancillary seal chamber is configured to receive at least a portion of the rotor shoe.

7. The seal assembly of claim 6, wherein the seal body comprises one or more vent conduits extending through the rotor shoe, the one or more vent conduits configured to provide fluid communication between the ancillary seal chamber and the fluid-bearing gap.

8. The seal assembly of claim 7, wherein the seal body comprises one or more crossover conduits extending through the flange of the seal body, wherein the one or more crossover conduits fluidly communicate with the ancillary seal chamber.

9. The seal assembly of claim 3, wherein the seal body defines an expansion chamber defined at least in part by the rotor shoe.

10. The seal assembly of claim 9, wherein the seal body comprises a laterally-distal seal wall, and wherein the expansion chamber is defined at least in part by the laterally-distal seal wall.

11. The seal assembly of claim 10, wherein the laterally-distal seal wall comprises one or more teeth configured to provide a forward seal interface with the rotor.

12. The seal assembly of claim 11, wherein the one or more fluid conduits, the one or more fluid supply apertures, and the fluid-bearing gap define at least a portion of a primary leakage path, and wherein the forward seal interface and the fluid-bearing gap define at least a portion of a secondary leakage path; wherein the secondary leakage path is configured to provide a flow of fluid through the fluid-bearing gap when operating the turbine engine with a first operating condition, and wherein the primary leakage path is configured to provide a flow of fluid through the fluid-bearing gap when operating the turbine engine with a second operating condition that differs from the first operating condition.

13. The seal assembly of claim 12, wherein the seal housing defines an ancillary seal chamber, and wherein the seal body comprises one or more vent conduits extending through the rotor shoe, the one or more vent conduits fluidly communicating between the expansion chamber and the ancillary seal chamber, and wherein the one or more vent conduits and the expansion chamber respectively define a further portion of the primary leakage path, the further portion of the primary leakage path located downstream from the fluid-bearing gap.

14. The seal assembly of claim 13, wherein the seal body comprises a flange extending between the rotor shoe and the piston head, and one or more crossover conduits extending through the flange, wherein the one or more crossover conduits fluidly communicate with the ancillary seal chamber, and wherein the one or more crossover conduits define an additional portion of the primary leakage path, the additional portion of the primary leakage path located downstream from the ancillary seal chamber.

15. The seal assembly of claim 1, wherein the seal housing comprises one or more seal body-positioning vents, the one or more seal body-positioning vents configured to supply fluid to and/or from the seal chamber and thereby cause the seal body to move along the radial axis in relation to the seal housing as a result of fluid in the seal chamber exerting a force on the seal body.

16. The seal assembly of claim 1, wherein the seal housing has a monolithic structure, and/or wherein the seal body has a monolithic structure.

17. The seal assembly of claim 1, wherein the one or more seal segments comprises a plurality of seal segments, wherein the plurality of seal segments respectively have a semiannular configuration; and wherein respective ones of the plurality of seal segments comprise one or more joining elements configured to mate with a circumferentially adjacent one of the plurality of seal segments.

18. The seal assembly of claim 1, wherein the one or more seal segments comprises one seal segment that has an annular configuration, wherein the seal housing has an annular configuration, and wherein the one seal segment comprises a plurality of seal bodies that have a semiannular configuration.

19. A turbine engine, comprising:

a rotor;

a stator; and a seal assembly disposed between the rotor and the stator, the seal assembly comprising one or more seal segments, the one or more seal segments respectively comprising:

a seal housing defining a seal chamber and one or more fluid supply apertures that pass through the seal housing; and a seal body comprising a seal face and one or more fluid conduits extending through the seal body to the seal face;

wherein the seal chamber receives at least a portion of the seal body, and wherein the seal body is movable within the seal chamber along a radial axis of the rotor of the turbine engine; and wherein the one or more fluid supply apertures fluidly communicate with the one or more fluid conduits, and wherein the one or more fluid conduits are configured to fluidly communicate with a fluid-bearing gap defined between the seal face and a rotor face of the rotor.

20. A method of sealing an interface between a rotor and a stator of a turbine engine, the method comprising:

flowing a fluid through a fluid-bearing gap disposed between a seal face of a seal assembly and a rotor face of the rotor of the turbine engine, the seal assembly comprising a seal housing and a seal body, the seal housing comprising one or more fluid supply apertures that pass through the seal housing, and the seal body comprising one or more fluid conduits that pass through the seal body, the one or more fluid supply apertures fluidly communicating with the one or more fluid conduits, and the one or more fluid conduits fluidly communicating with the fluid-bearing gap; and moving the seal body along a radial axis of the rotor of the turbine engine in relation to the seal housing while flowing the fluid through the fluid-bearing gap, wherein the seal housing defines a seal chamber and wherein at least a portion of the seal body is disposed within the seal chamber, wherein the seal chamber receives at least a portion of the seal body, and wherein the seal body is movable within the seal chamber along a radial axis of a rotor of the turbine engine when the seal assembly is installed in the turbine engine.

* * * * *